(12) United States Patent
Hamm et al.

(10) Patent No.: US 6,182,857 B1
(45) Date of Patent: Feb. 6, 2001

(54) OFFICE SUPPLY VENDING SYSTEM AND APPARATUS

(76) Inventors: Doug A. Hamm, 8702 Cedarwood La., Highlands Ranch, CO (US) 80126; William O. Swift, 4730 Crooked Nail La., Batavia, OH (US) 45103

(*) Notice: Under 35 U.S.C. 154(b), the term of this patent shall be extended for 0 days.

(21) Appl. No.: 09/224,585

(22) Filed: Dec. 31, 1998

(51) Int. Cl.[7] .............................. G07F 11/00; G07F 11/16; A24F 15/04
(52) U.S. Cl. .................................. 221/2; 221/5; 221/254
(58) Field of Search ............................. 221/2, 5, 7, 12, 221/13, 254, 270, 271, 306

(56) References Cited

U.S. PATENT DOCUMENTS

| | | |
|---|---|---|
| 3,160,315 * | 12/1964 | Stone et al. ................... 221/270 X |
| 3,734,344 | 5/1973 | Teichelman . |
| 3,796,294 | 3/1974 | Hoffer et al. . |
| 4,412,292 | 10/1983 | Sedam et al. . |
| 4,654,799 | 3/1987 | Ogaki et al. . |
| 4,672,554 | 6/1987 | Ogaki . |
| 4,674,055 | 6/1987 | Ogaki . |
| 4,677,565 | 6/1987 | Ogaki . |
| 4,787,050 | 11/1988 | Suzuki . |
| 4,804,107 | 2/1989 | Bergstedth . |
| 4,866,661 | 9/1989 | Prins . |
| 4,896,024 | 1/1990 | Morello et al. . |
| 4,896,791 | 1/1990 | Smith . |
| 4,947,028 | 8/1990 | Gorog . |
| 4,961,507 | 10/1990 | Higgins . |
| 5,042,686 | 8/1991 | Stucki . |
| 5,091,713 | 2/1992 | Horne et al. . |
| 5,150,817 | 9/1992 | Livingston . |
| 5,207,784 | 5/1993 | Schwartzendruber . |
| 5,335,816 * | 8/1994 | Kaufman et al. ................ 221/270 X |
| 5,386,462 | 1/1995 | Schlamp . |
| 5,408,417 | 4/1995 | Wilder . |
| 5,450,938 | 9/1995 | Rademacher . |
| 5,475,585 | 12/1995 | Bush . |
| 5,499,707 | 3/1996 | Steury . |
| 5,520,275 | 5/1996 | Foglino . |
| 5,608,643 | 3/1997 | Wicher et al. . |
| 5,638,985 | 6/1997 | Fitzgerald et al. . |
| 5,641,050 | 6/1997 | Smith et al. . |
| 5,728,999 | 3/1998 | Teicher . |
| 5,791,512 | 8/1998 | Kanatsuka . |
| 5,822,216 | 10/1998 | Satchell, Jr. et al. . |
| 5,870,698 | 2/1999 | Riedel et al. . |

FOREIGN PATENT DOCUMENTS

| | | |
|---|---|---|
| 30 48 586 | 7/1982 | (DE) . |
| 0 351 335 A1 | 7/1989 | (EP) . |
| 2 601 267 | 1/1988 | (FR) . |
| WO97/28510 | 8/1997 | (WO) . |

* cited by examiner

*Primary Examiner*—Christopher P. Ellis
*Assistant Examiner*—Gene O. Crawford

(57) ABSTRACT

The preferred embodiment of the present invention is an integrated product supply network comprised of a computer network linked through a variety of methods to a plurality of intelligent vending or dispensing machines and each component of the overall product supply network. The intelligent vending or dispensing machine is comprised of a combination of dispensing mechanisms including one type that it allows for both vertical and horizontal displacement of products to allow a wider variety of products to be offered for sale. In particular, the dispensing mechanism allows paper and art supplies to be dispensed. The intelligent dispensing machine is particularly useful in catering to small offices that need supplies any time, day or night.

20 Claims, 13 Drawing Sheets

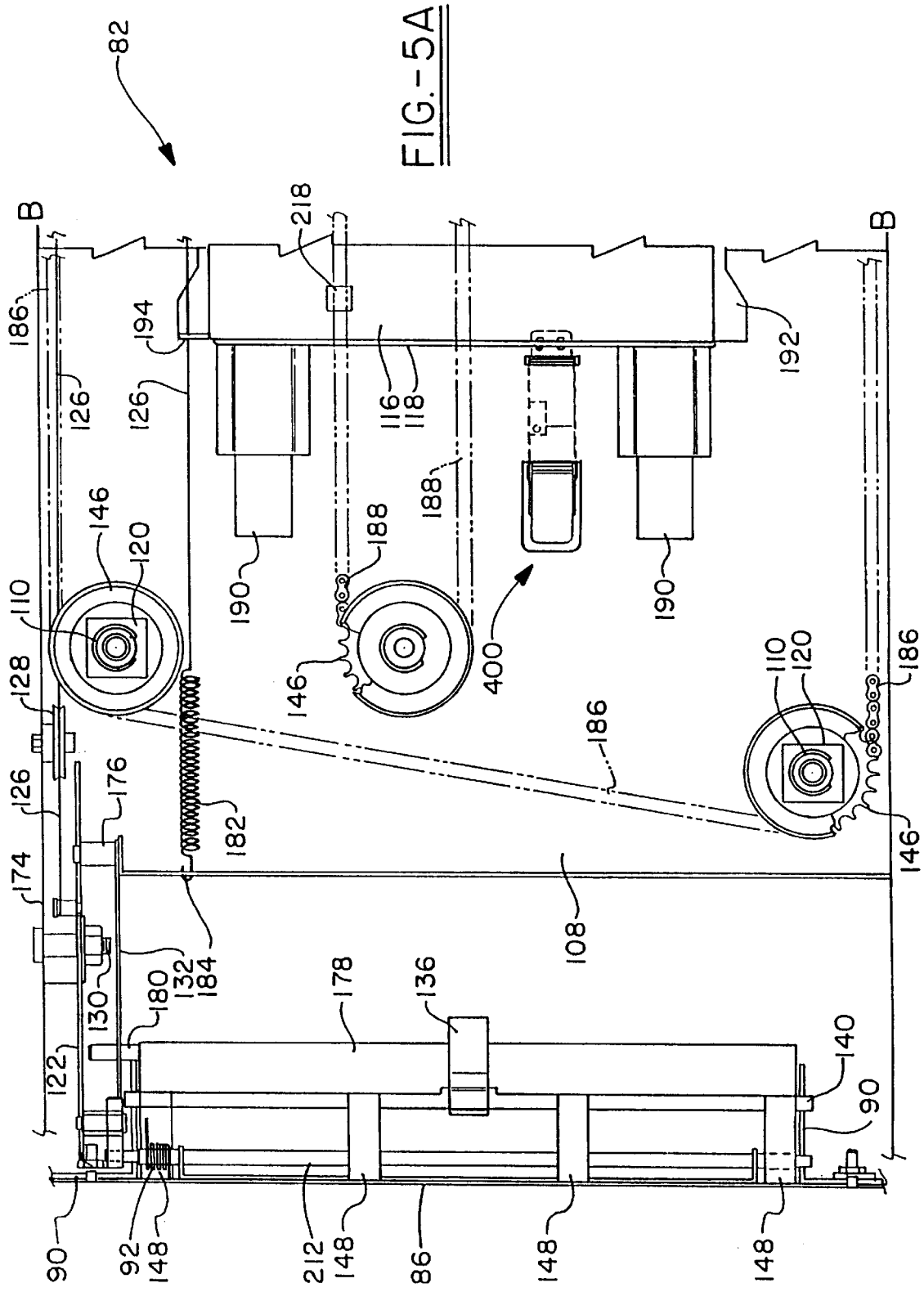

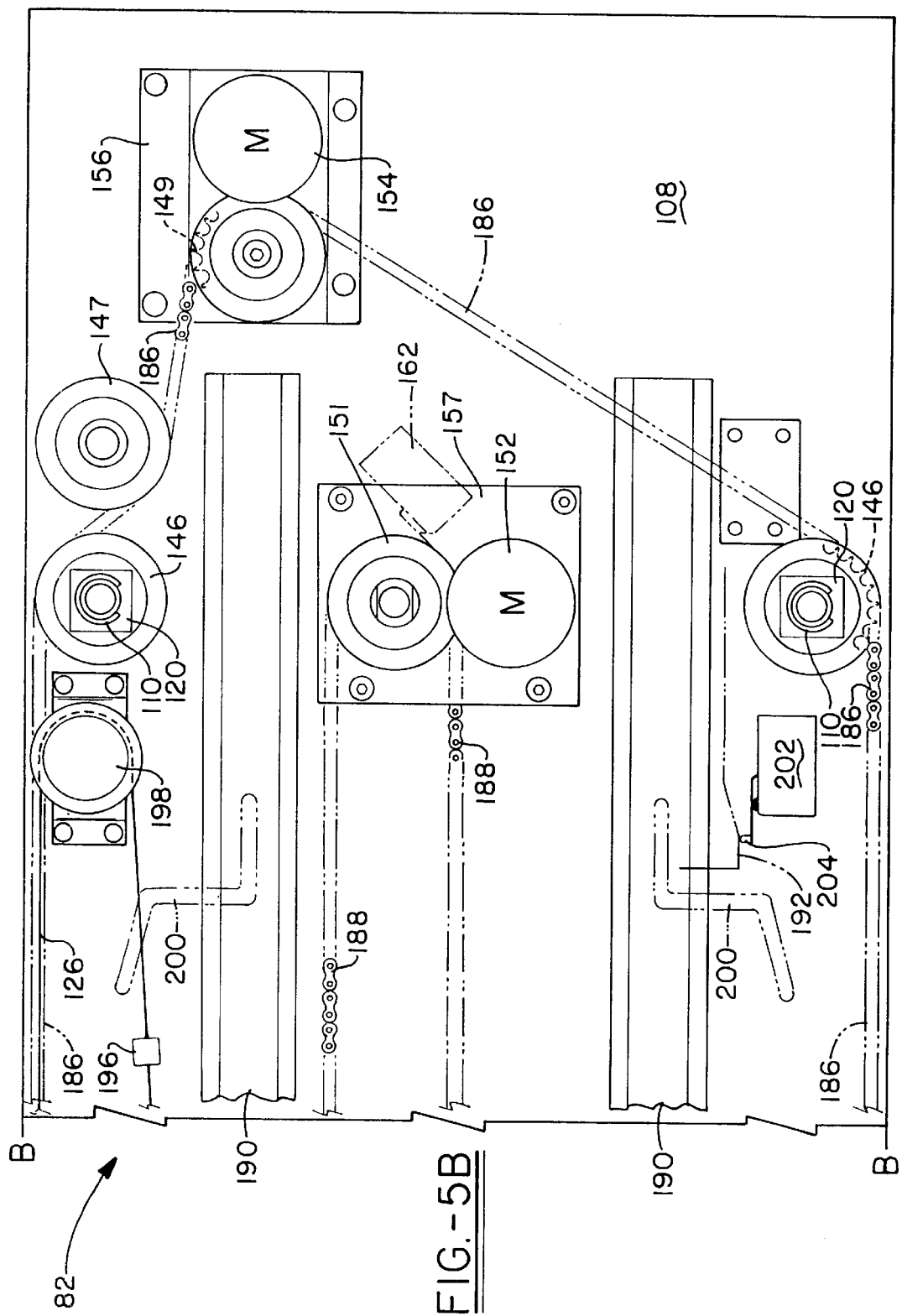

OFFICE SUPPLY VENDING SYSTEM AND APPARATUS

TECHNICAL FIELD

The present invention relates to a vending system for distribution of products. More specifically, the invention relates to an integrated product supply network consisting of intelligent vending or dispensing machines linked through a computer network to the entire channel of distribution for particular products. The intelligent dispensing machines include an improved product discharge mechanism allowing the machines to accommodate a variety of products.

BACKGROUND OF THE INVENTION

Many varieties of automatic vending devices are in common, everyday use. These include not only machines for vending snack foods, soft drinks, or other food items, but also machines that vend services, such as vending photocopiers, pay telephones and laundry machines.

Varieties of merchandise dispensing devices have been developed for many different types of products. Most typically such assemblies operate with uniformly packaged products. Depending upon the packaging, an attendant electro-mechanical assembly sequentially advances the product requested by a user. Refrigerated and heated products have also been maintained in enclosures having mechanical support units which dispense the product at a preferred temperature.

While vending machines have consistently provided a convenient means for obtaining a variety of products, most suffer from numerous drawbacks. For starters, most machines consist of individual units whose inventory must be checked manually every so often. This creates a significant labor cost in running vending machines as one or more people must travel to each vending machine location. Either a person checks the machine too many times to ensure it never depletes its inventory or the machine is not checked enough and the inventory runs short angering potential customers. The manual effort involved in keeping track of the vending machine's inventory also applies to ensuring the machine is operating correctly. In addition, the inventory data must then be manually collected and re-entered into an inventory tracking system if any automation is to be implemented, which also requires additional time and manpower.

The mechanical mechanisms for actually dispensing products from prior art vending machines has also fallen short as to the number of different products which can be dispensed. Typical vending machines employ a spiral guide device that rotates and pushes products to the front of the machine until they fall from a shelf to an opening in the bottom of the machine. Sometimes individual doors are used which require the customer to open and reach into the door to obtain the product. The prior art typically only allows movement of products in one direction or another, usually horizontally. The mechanisms found in the prior art tend to limit the products which can be made available through vending or dispensing machines.

Therefore, in light of the foregoing and other deficiencies in the prior art, the applicant's invention is herein presented.

SUMMARY OF THE INVENTION

The preferred embodiment of the present invention is an integrated product supply network comprised of a computer network linked through a variety of methods to a plurality of intelligent vending or dispensing machines. The computer network also connects to and communicates with each component of the overall product supply network, i.e., product suppliers, warehouses, local partners, banks and any other entities included in the supply network. In the preferred embodiment, the integrated product supply network takes advantage of the Internet to accomplish automated control of and communication with the components of the network.

The intelligent vending or dispensing machine of the preferred embodiment is comprised of a combination of dispensing mechanisms. One of the dispensing mechanisms is unique to the present invention in that it allows for both vertical and horizontal displacement of products to allow a wider variety of products to be offered for sale. In particular, the dispensing mechanism allows paper and art supplies to be dispensed. The intelligent dispensing machine is particularly useful in catering to small offices that need supplies any time, day or night. The nature of most small businesses is such that employees work strange hours, usually after most office supply stores have closed. The intelligent office supply dispensing machine of the preferred embodiment fills the need for office supplies no matter when they are needed.

These along with other objects and advantages of the present invention will become more readily apparent from a reading of the detailed description taken in conjunction with the drawings and the claims.

BRIEF DESCRIPTION OF THE DRAWINGS

FIGS. 2A and 2B are frontal views of auxiliary and/or slave dispensing machines as may be applied to the invention;

FIGS. 5A and 5B, when combined at line B—B, illustrate a partially schematic plan view of the drive means which are positioned on the underside surface of the product dispensing unit shown in FIGS. 3A–3B;

DETAILED DESCRIPTION OF THE PREFERRED EMBODIMENT

Figure 1:
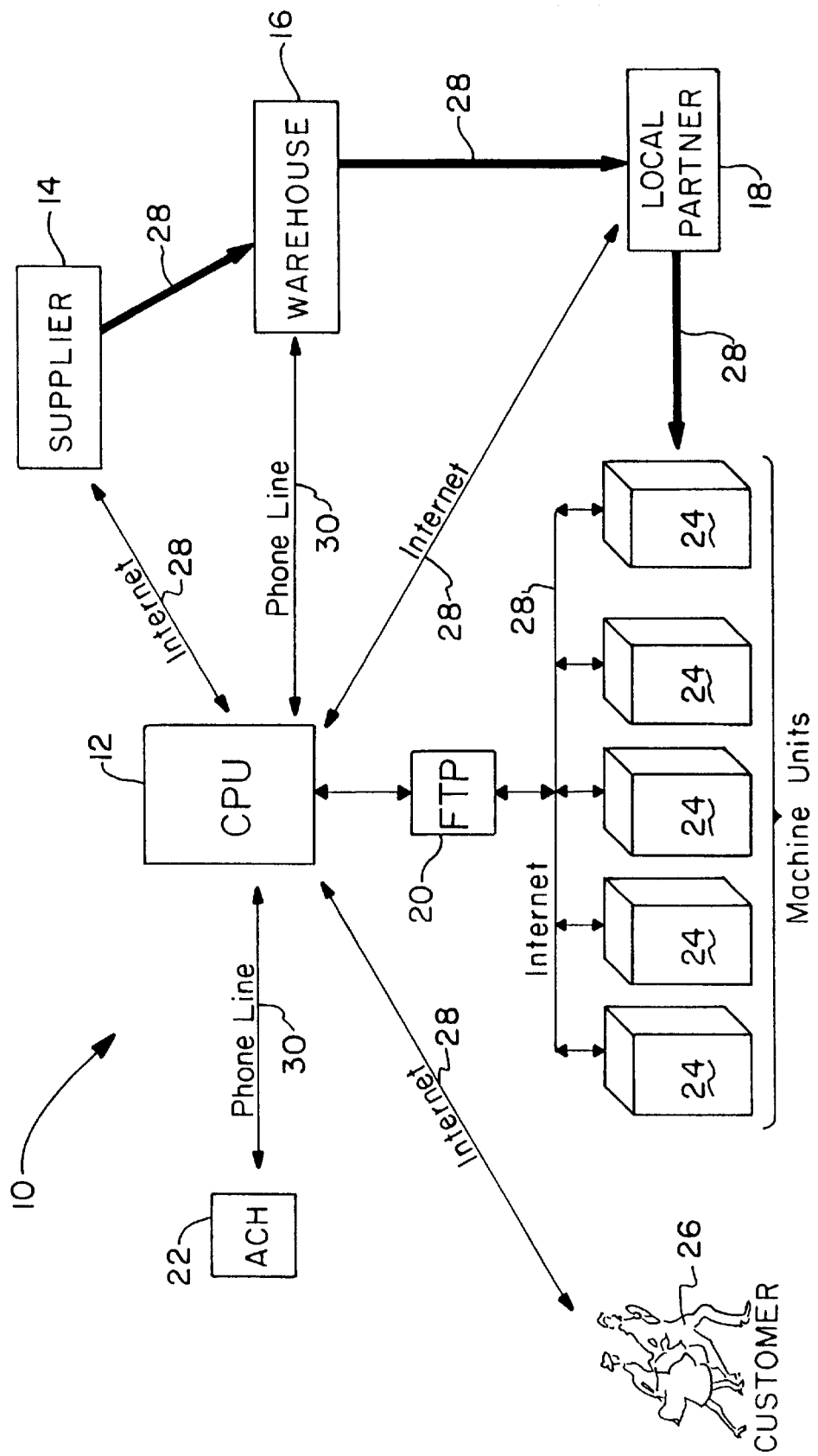
FIG. 1 diagrammatically illustrates a product dispensing system according to the present invention.

FIG. 1 diagrammatically illustrates the integrated product supply network 10 of the present invention. The components of the invention form an integrated supply network 10 which encompasses the entire channel of distribution for products ultimately provided to customers 26 through intelligent dispensing machines 24. In the preferred application, intelligent dispensing machines 24 supply customers 26 with a variety of office supplies including core office products such as paper, ink jet cartridges, diskettes, CDs, photo materials, etc. As will later be explained, intelligent dispensing machines 24 are also equipped to dispense a wide variety of products, in part due to the novel dispensing device 82 shown in FIGS. 4–6.

As shown in FIG. 1, the entire integrated product supply network 10 is centered around a computer or CPU 12 which handles various functions including maintaining and monitoring a data base of inventories for suppliers 14, warehouses 16 and local partners 18, preparing and transmitting credit/debit files to automated clearing houses 22 for processing, receiving deposits from automated clearing houses 22, preparing and sending reports to web pages for local partners 18, regional partners (not shown) and suppliers 14, and various other automated processing functions. The integrated product supply network 10 itself includes an unlimited number of intelligent dispensing machines 24 each coupled to an FTP or file transfer protocol server 20 which receives, decodes and verifies the completeness of data files generated by and transferred from intelligent dispensing machines 24 to FTP server 20. The information transmitted from intelligent dispensing machines 24 to FTP server 20 is automatically generated when a customer 26 uses dispensing machines 24 to receive products. Transaction records based upon products dispensed are converted to appropriate file formats, encrypted an then transmitted over the Internet 28 to FTP server 20.

Each individual intelligent dispensing machine 24 includes its own computer coupled to a modem allowing dispensing machines 24 to initiate calls over standard telephone lines to connect to the Internet 28. The computer, modem and associated electrical components will be described in more detail in reference to FIG. 7, although it should be noted that the computer, modem and additional circuitry are all well known to one of ordinary skill in the electronic and computer arts and the exact combinations and methods for these components can be implemented in a variety of ways. Once the encrypted transaction records are received from dispensing machines 24, FTP server 20 then transmits the encrypted information to Computer 12 through standard means comprised of modems and telephone line connections.

As will be described later, intelligent dispensing machines 24 include means for receiving payment by credit, debit and/or bar code cards. One of the functions carried out through computer 12 is the processing of the payments through the credit/debit cards. To accomplish this computer 12 is coupled via telephone line 30 to an automated clearing house (ACH) 22, such as a local or national bank. Computer 12 prepares and transmits credit/debit files based on the information received from the individual intelligent dispensing machines 24 to the automated clearing house 22 for processing. Via the same telephone line 30, computer 12 then receives deposits from automated clearing house 22 to complete the payment cycle.

As part of integrated product supply network 10, computer 12 is coupled to suppliers 14, warehouses 16 and local partners 18. In the preferred embodiment both suppliers 14 and local partners 18 communicate with computer 12 through the Internet 28. Warehouse 16 is shown coupled to computer 12 via telephone line 30. In addition, supplier 14 can communicate with warehouse 16 through and warehouse 16 can communicate with local partner 18 through the Internet 28. The supply chain is completed by local partners 18 communicating with the various intelligent dispensing machines 24, again through the Internet 28. The preferred means of electronic communication between the various components of the distribution channel is over the Internet due to its low cost and world wide communication capabilities. While the Internet is the preferred mode of communication any type of electronic communication can be used and is contemplated by Applicant. Examples of such other modes of communications include but are not limited to direct telephone lines, cellular communication, microwave, high frequency and/or digital satellite communications.

By electronically coupling Computer 12 to suppliers 14, integrated product supply network 10 is capable of automatically ordering products from suppliers 14 based upon the real time customer information received from the individual intelligent dispensing machines 24. This allow for improved inventory management, capital investment and production scheduling. In addition, suppliers 14 are able to communicate throughout integrated product supply network 10 to monitor the real time demand for their products by customers 26. The same applies to the various warehouses 16 included within the supply network 10. Suppliers 14 are able to automatically, electronically monitor product distribution through the various dispensing machines 24 to insure sufficient inventory is maintained at the various warehouses 16. Playing a critical role in integrated product supply network 10 are local partners 18 who have the responsibility of establishing the most productive locations for the individual intelligent dispensing machines 24.

Local partners 18 are also responsible for maintaining necessary inventories of products, replenishing the individual intelligent dispensing machines 24, responding to customer demographic needs, maintenance of the dispensing machines 24 and promoting the overall concept within their local markets embodied in the integrated product supply network 10 of the present invention. Local partners 18 are tied into integrated product supply network 10 electronically to communicate with Computer 12, warehouse 16 and individual dispensing machines 24. As should be apparent, automated clearing house 22, suppliers 14, warehouses 16 and local partners 18 are made up of individual businesses all linked through automated electronic computer equipment, such as personal computers or PCS, that are well known and used in almost all types of business. Although not shown, these computers typically include a modem for communicating electronically with other computers through telephone lines, cable television lines and/or wireless means such as cellular and satellite links. All of the electronic computer and communication equipment is well know to one of ordinary skill in the electronic arts. By having the entire supply chain connected electronically in one fashion or another to the plurality of intelligent dispensing machines 24, inventory, product selection and a whole host of other business decisions can be made automatically and based on real time transactions monitored at all levels.

Several examples of the efficiencies gained through integrated product supply network 10 are set forth as follows: local partner 18 can monitor a plurality of intelligent dispensing machines 24 and automatically order products from warehouse 16 as needed while informing Computer 12 of these actions simultaneously. Warehouse 16 can then automatically order needed products from supplier 14 in response to electronic requests from local partner 18, with Computer 12 again monitoring this transaction. Computer 12 can also handle payment for supplies and other expenses using electronic credit and debits to the suppliers 14, warehouses 16 and local partners 18. Each of these entities can in turn issue credits and/or make payments electronically through computer 12 which then clears these transactions through automated clearing house 22.

The integrated product supply network 10 even allows customers 26 to communicate directly with Computer 12 through the Internet 28 to learn of new products, supply feedback via e-mail, and a whole host of other applications. While each stage of the supply network could be handled manually or in part manually, it could also be entirely automated using appropriate software thereby reducing overall transaction costs while maintaining last minute but optimal inventory and supplies within the supply network 10 and the individual intelligent dispensing machines 24.

Figure 2:
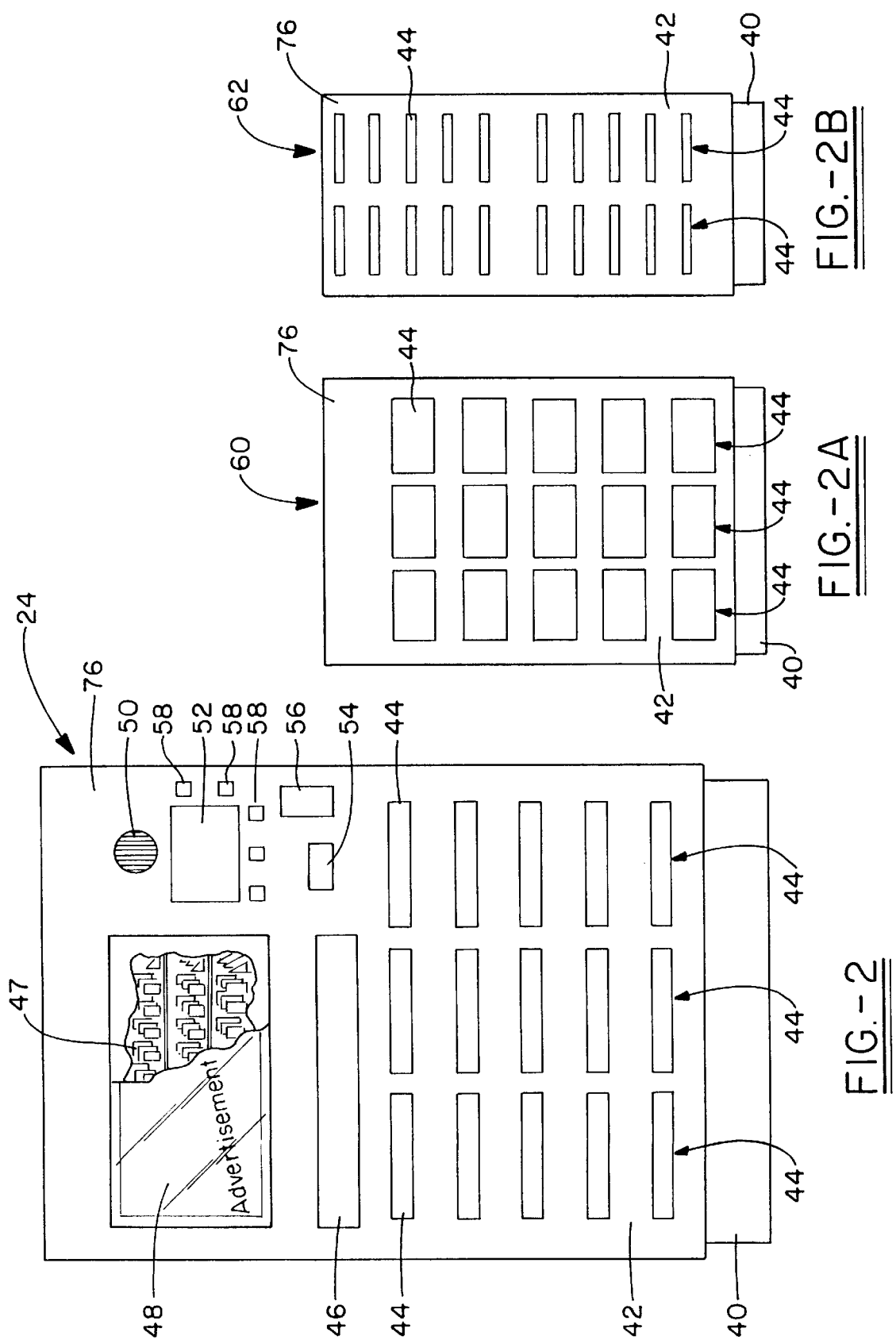
FIG. 2 is a frontal view of a dispensing machine as defined by the invention.

FIG. 2 discloses intelligent dispensing machine 24 of the present invention. Dispensing machine 24 includes base 40 and cabinet 76 which maintains and supports the internal mechanisms which make up intelligent dispensing machine 24. The front of intelligent dispensing machine 24 as seen by a customer includes an advertising board 48 and/or a plurality of product feed mechanisms 47, speaker 50, display 52, printer output 54, magnetic and/or bar code card reader 56, a plurality of input push buttons 58, product delivery shoot 46 and a plurality of individual delivery doors 44. When a customer approaches intelligent dispensing machine 24 he or she is prompted by display 52 to choose a product to be dispensed. Several modes are contemplated for communicating with customers. First, advertising board 48 is used to show customers pictures of the various products available within dispensing machine 24 and can be arranged in multiple configurations. Advertising board 48 could consist of a back lit plastic sign of pictures of various products. It could also be a display case with the actual products arranged for the customers viewing or could even be some type of television or CRT display showing a video taped presentation of the various products. In an alternate embodiment advertising board 48 could be replaced with window 66. The actual products offered for sale by dispensing machine 24 would be arranged behind window 66 for viewing by customers.

Several other modes of communication incorporated within dispensing machine 24 include having display 52 indicate which products are available while prompting the customer for the desired product. A further contemplated application would use speaker 50 to audibly request the customer's desired product and then dispense the product through the use of voice recognition technology. In a simpler embodiment dispensing machine 24 would audibly instruct the customer as to which input push button 58 to depress. Further embodiments would include display 52 coupled with touch screen technology to allow the screen to display text and/or figures and then provide a computer with the desired selection based upon were the customer touched display 52. Applicant contemplates any of the previously described methods of communicating with customers including various combinations of these methods. The present invention is not to be limited to only the disclosed methods of communication. Other means of communications not presently available are also contemplated as the actual means of communication is not critical.

Once the desired products have been selected display 52 will prompt the customer to pay for the products. As with vending machines known in the prior art the customer could insert coins or dollar bills but in the preferred embodiment payment is made using credit and/or debit cards. Intelligent dispensing machine 24 includes magnetic card reader 56 which is capable of processing the credit, debit and/or bar code cards. Magnetic card/bar code reader 56 consists of a standard electromagnetic device which reads and/or writes magnetic information to and from a credit/debit card which is then used to process customer transactions. In the preferred embodiment the most versatile magnetic card reader 56 will allow both read and write operations to promote the use of custom debit cards in addition to major credit cards. When equipped with write capabilities, one of the most versatile applications of magnetic card reader 56 is that it can reprogram a debit card after each purchase until the amount stored on the debit card is depleted. In the preferred embodiment, reader 56 will also accept and read bar codes. This feature allows customers to purchase products from dispensing machine 24 without worrying about credit or debit limits. The integrated product supply network 10 keeps track of the customers purchases and bills the customer periodically for all purchases tracked to the particular bar code providing additional convenience to customers.

There are several reasons magnetic card reader 56 is preferred over currency devices commonly found in traditional vending machines. With so many people today carrying credit cards convenience alone is its biggest benefit. Having dispensing machine 24 capable of processing credit card transactions also allows less traditional products to be sold through dispensing machine 24. Common vending machines are typically limited to inexpensive products which must be sold at set prices usually in increments of 25 cents or 1 dollar. By accepting credit cards, dispensing machine 24 can accept any price including odd increments allowing for more versatile pricing and a wider variety of products. Because credit cards are only limited by the users available credit limit, higher priced items may also be distributed through dispensing machine 24. While the present invention is not limited to any particular products the preferred embodiment is geared towards the small office or home office markets for various types of business supplies such as paper, computer disks, printer cartridges, note pads and a wide variety of other office products. Being able to accept credit card transactions allows dispensing machine 24 to offer products ranging from expensive ink jet or laser printer cartridges all the way down to inexpensive floppy diskettes or similar items.

Added to the versatility of dispensing machine 24 is its ability to use debit cards to keep track of transactions or prevent unauthorized purchases and abuses by employees. A problem all too common to business of all sizes is the internal theft of office supplies by employees. Because magnetic card reader 56 can write information into or read information from a debit card, any number of security features can be implemented. For example, a debit card can be programmed to only be valid for certain periods of time. This type of arrangement is useful in preventing debit cards taken or stolen by former employees from being used unlawfully for too long after they are taken. The limited operating feature can also be used to prevent employees from accessing dispensing machine 24 after hours or on weekends if such times are deemed unauthorized. Debit cards can also be programmed to only allow a certain number of transactions or transactions up to a certain dollar amount or they could require a different password to be used with the debit card. Because of their reprogrammable characteristics debit cards can incorporate almost any security combination which can be implemented using computer technology. As will be discussed later, dispensing machine 24 is controlled by computer 72, shown in FIG. 3, which is electrically coupled to magnetic card reader 56 to process all payment transactions.

Dispensing machine 24 also includes printer 54 mounted on door 42 in proximity to display 52, input push buttons 58 and magnetic card reader 56. Printer 54 provides customers with printed receipts for their transactions to verify purchases and maintain expense records for business and tax purposes. Also included in door 42 of dispensing machine 24 are a plurality of individual delivery doors 44 and product delivery shoot 46, both used to provide the purchased products to the customer. Product delivery shoot 46 is similar to product delivery mechanisms used on most vending machines in that products stored in product feed mechanisms 47 fall into a catching bin which the customer then accesses. The plurality of individual delivery doors 44 are used to provide a wide variety of products to customers but in the preferred embodiment are designed to deliver various types of paper, ranging from stationary to computer paper to arts and craft paper products. The particular details of how the plurality of individual delivery doors 44 function will be described subsequently in greater detail.

To offer customers an even wider variety of products one or more auxiliary or slave dispensing machines, 60 and 62, can be incorporated within integrated product supply network 10, either directly or indirectly, through computer 72 of dispensing machine 24. FIGS. 2A and 2B disclose alternate embodiments of slave dispensing machines 60 and 62, both comprised of cabinet 76, base 40, door 42 and a plurality of individual delivery doors 44. Slave dispensing machine 60 includes large rectangular delivery doors 44 while slave dispensing machine 62 has thin rectangular delivery doors 44, similar to those disclosed in FIG. 2. One of ordinary skill in the art will recognize that any combination of different dimensioned delivery doors may be incorporated within any number of slave dispensing machines to provide customers with an essentially limitless offering of products provided through the convenience of vending machines.

Figure 3:
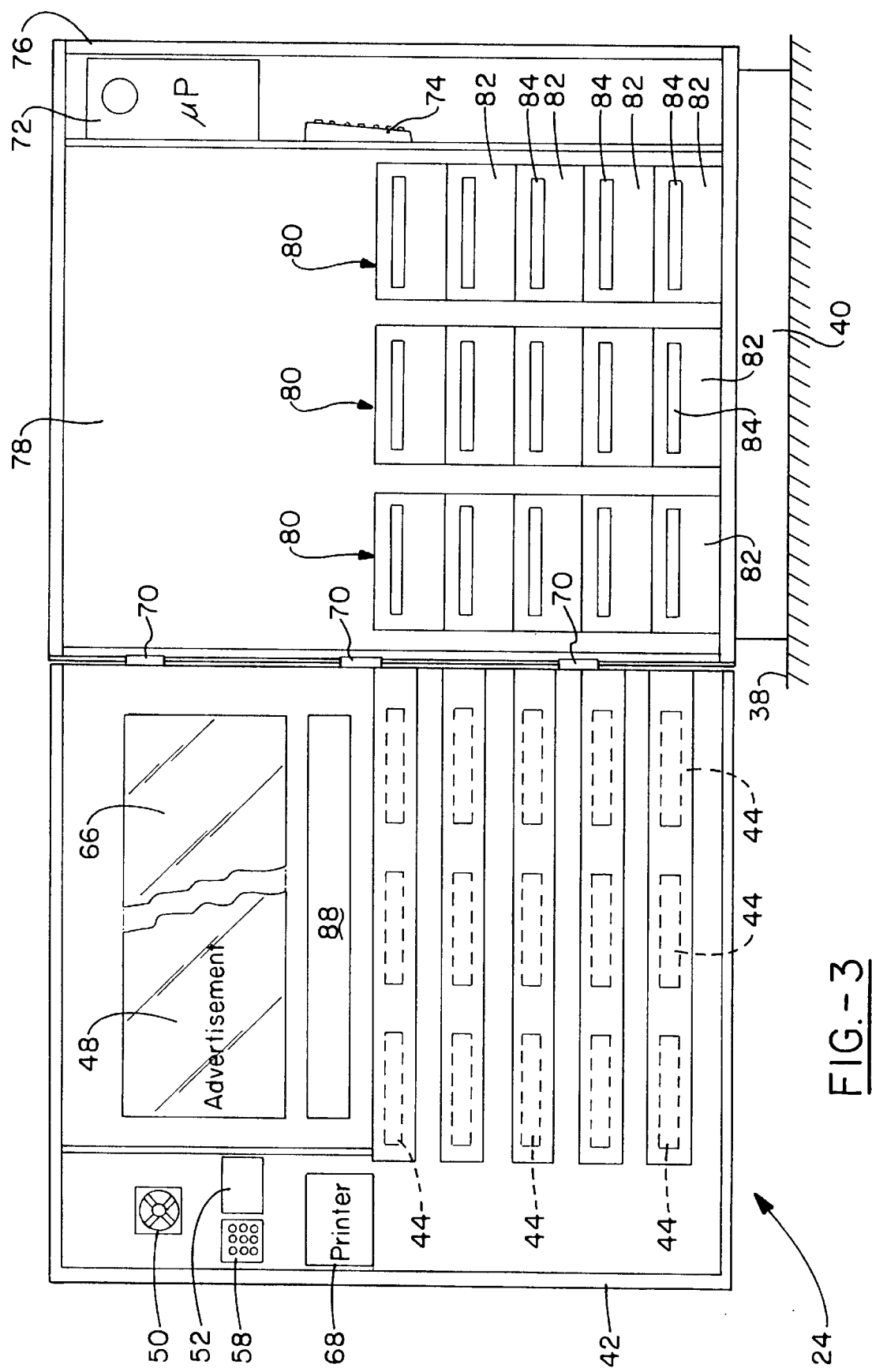
FIG. 3 is a perspective view of a dispensing machine in a door opened condition.

FIG. 3 shows the preferred embodiment of dispensing machine 24 with door 42 in an opened condition. As in standard vending machines, door 42 is connected to cabinet 76 by one or more hinges 70 to allow door 42 to rotate to an open condition. As described earlier, mounted within an upper portion of door 42 is either window 66 or advertising board 48, depending on the actual configuration of dispensing machine 24. Along the inner left side of door 42 are the plurality of input push buttons 58, display 52, speaker 50 and printer 68. Each of these components is mounted on door 42 and aligned with various predetermined apertures to allow select portions of the components, such as input push buttons 58 or the visual portion of display 52, to extend through the various apertures where customers can access the select portions.

Included within door 42 is product delivery aperture 88 positioned below advertising board 48 or window 66. Aperture 88 allows customers to retrieve products dispensed by product feed mechanisms 47, shown earlier in FIG. 2. Door 42 of dispensing machine 24 also includes the plurality of individual delivery doors 44 which allow products to be dispensed to customers. In the preferred embodiment products dispensed through individual delivery doors 44 will be various types of paper.

The bulk of dispensing machine 24 is housed within cabinet 76 which includes base 40 positioned beneath cabinet 76 and resting upon floor surface 38. Although not shown, product feed mechanisms 47 are mounted within cabinet 76 in area 78. Again, product feed mechanisms 47 are standard vending machine feed mechanisms which are well known in the prior art for dispensing various food products. To store and dispense products, and in particular paper products, dispensing machine 24 includes a plurality of multi-product dispensing units 80, each comprised of a number of dispensing devices 82. Each dispensing device 82 includes product feed position 84 which aligns with individual delivery doors 44 when door 42 is in a closed condition.

As will be described in further detail subsequently, dispensing devices 82 provide a unique and novel means of dispensing products, and in particular products such as sheets and packages of paper. Each multi-product dispensing unit 80 is comprised of multiple dispensing devices 82 stacked upon one another and mechanically coupled together. In the preferred embodiment each multi-product dispensing unit 80 is comprised of five dispensing devices 82 with dispensing machine 24 having three multi-product dispensing units 80. Applicant contemplates and one of ordinary skill in the art would understand that various combinations of dispensing devices 82 could be used to make up multi-product dispensing units 80 and that fewer or more multi-product dispensing units 80 could be incorporated within dispensing machine 24. In no way is the present invention meant to be limited to the specific arrangement or quantities of dispensing devices 82 or dispensing units 80 disclosed. Intelligent dispensing machine 24 can be manufactured to any desired size. Small versions of intelligent dispensing machine 24 could be used in small offices, office buildings, hotel rooms, dormitories or anywhere else where products, and in the preferred embodiment office products, are needed. On the other hand, large industrial versions of intelligent dispensing machine 24 could be used within factories, warehouses and other types of industrial facilities.

As previously mentioned, intelligent dispensing machine 24 includes computer 72 which electronically controls product feed mechanisms 47, each of the plurality of dispensing devices 82, receipt printer 68, input push buttons 58, display 52 and speaker 50. How computer 72 controls the various input and output (I/O) devices incorporated within dispensing machine 24 will be described later including the electrical coupling between computer 72 and various I/O devices. The process control steps implemented by software within computer 72 will also be described. As a convenience, keyboard 74 may optionally be included within cabinet 76 and electrically connected to computer 72 to allow a service technician to manually enter or query computer 72 during the manufacturing of intelligent dispensing machine 24 or when servicing machine 24 at a later date.

Figure 4A:
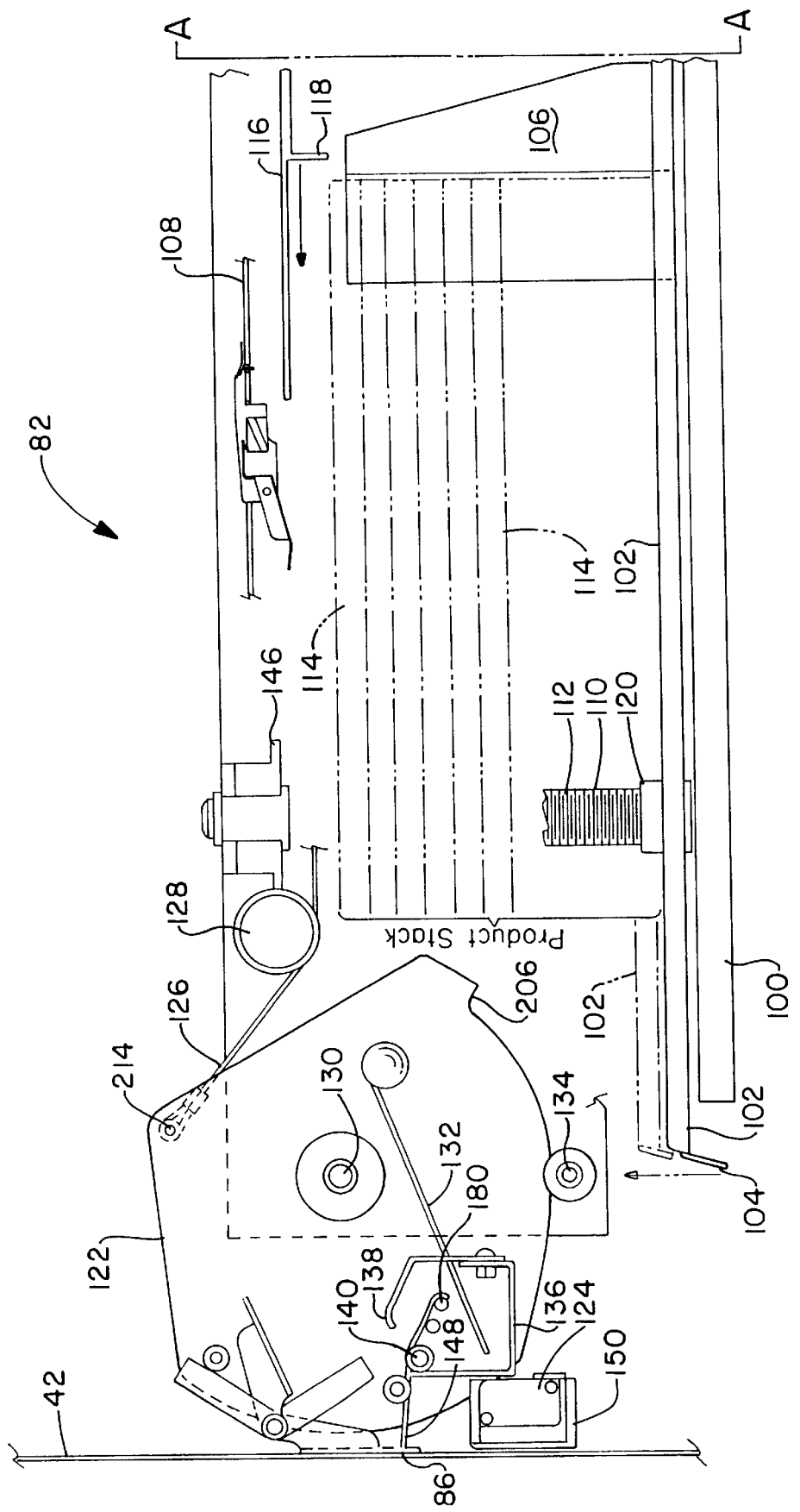
FIGS. 4A and 4B, when combined at line A—A, illustrate a partially schematic side elevational view of a product dispensing unit which forms a primary part of the dispensing machine shown in FIG. 2.
Figure 4B:
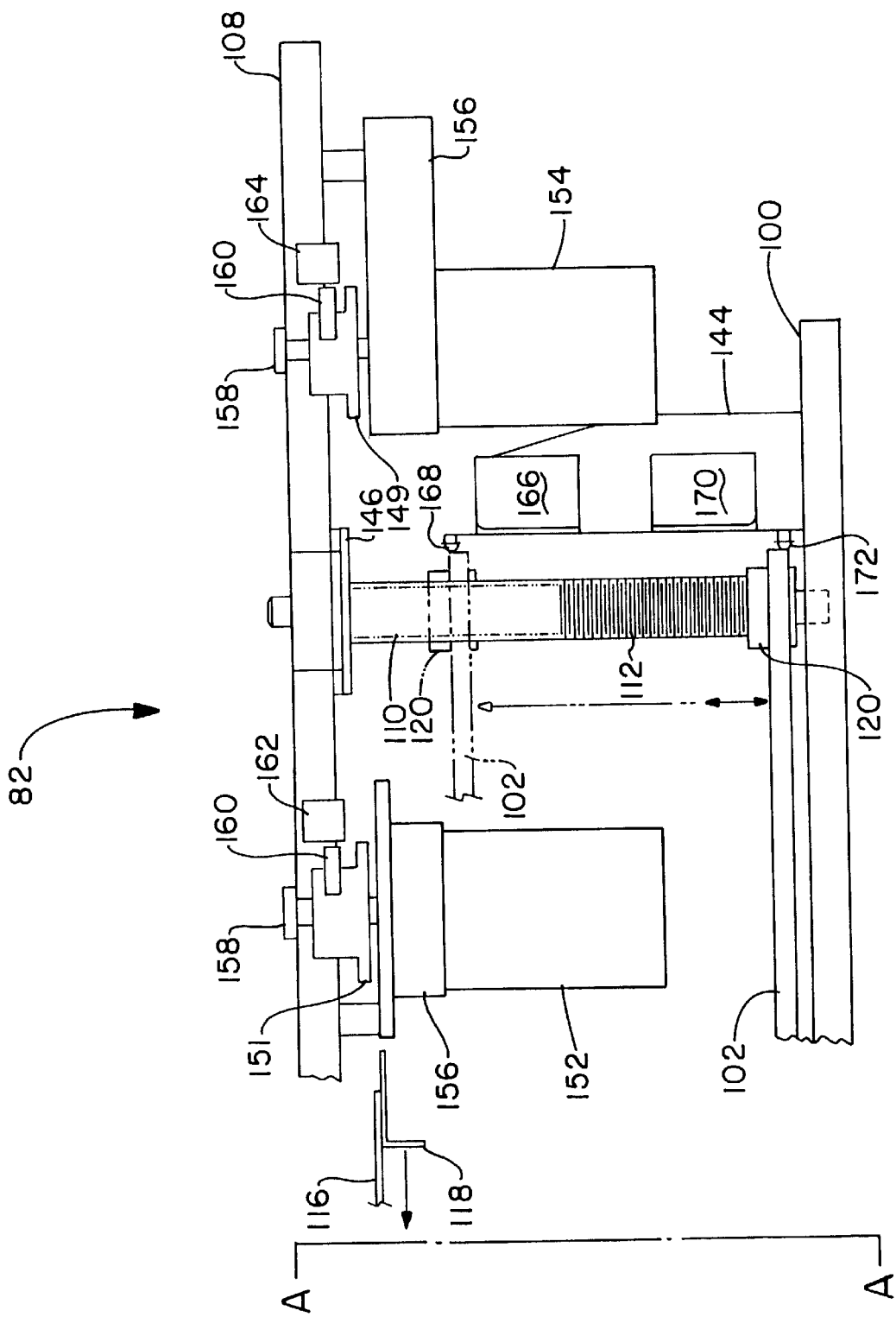

Referring now to FIGS. 4A, 4B, 5A and 5B, the unique and novel dispensing means (dispensing device 82) incorporated within intelligent dispensing machine 24 will now be described. To fully appreciate the following description reference must be made to FIGS. 4A and 4B combined at line A—A and FIGS. 5A and 5B combined at line B—B, where FIGS. 4A and 4B illustrate a side elevational view of dispensing device 82 and FIGS. 5A and 5B illustrate a plan view of the drive means positioned on the underside of the top of dispensing device 82.

Beginning with FIGS. 4A and 4B, dispensing device 82 is comprised and configured upon bottom support 100 which is fabricated as a metal plate to serve as a base for dispensing device 82. Coupled to and extending from bottom support 100 are four elevating screws 110. At the upper ends of each elevating screw 110, top support 108 is attached, which again is fabricated as a metal plate similar to bottom support 100. Adjustably coupled to each elevating screw 110 is product shelf 102 which is positioned between bottom support 100 and top support 108. Product shelf 102 is fabricated from metal or other durable materials and is used to hold products 114 which will eventually be dispensed. Formed in one end of product shelf 102 is label holder 104 used to hold a product label on product shelf 102 simplifying restocking of each shelf. In operation, product shelf 102 translates up or down in synchronization with the rotation of the plurality of elevating screws 110. Under normal conditions product shelf 102 will have a plurality of products 114 stacked upon itself ready to be dispensed to a customer. Products 114 at the top of the stack are the first to be dispensed with additional products 114 needing to be vertically elevated until all of the products 114 stacked upon product shelf 102 have been dispensed. As each product 114 is requested by a customer, the plurality of elevating screws 110 rotate together to elevate product shelf 102 in predetermined increments thereby positioning the next product 114 for dispensing. Once all of the products 114 have been depleted from product shelf 102, the plurality of elevating screws 110 are rotated in an opposite direction to lower product shelf 102 to its default lower position.

Each elevating screw 110 includes male threads 112 disposed along its length which interact with female threads (not shown) formed within shelf mounting blocks 120. To accommodate each of the plurality of elevating screws 110, product shelf 102 includes a plurality of apertures (not shown) which elevating screws 110 freely pass through. Coupled to the apertures are shelf mounting blocks 120 having an aperture lined with female threads to receive elevating screws 110. Each shelf mounting block 120 is mechanically coupled to product shelf 102 so as the plurality of elevating screws 110 rotate, shelf mounting blocks 120 are either pulled upward or pushed downward along the elevating screws 110 depending upon the direction of rotation, which in turn pulls or pushes product shelf 102 up or down.

As discussed previously, a plurality of dispensing devices 82 are stacked upon and mechanically coupled to one another to form each multi-product dispensing unit 80. As shown in FIGS. 4A and 5A, each elevating screw 110 encapsulates post 142 and bearings 158. In one preferred embodiment, the means of mechanically coupling together multiple dispensing devices 82 consists of attaching the studs 142 in the various dispensing devices 82 to one another thereby vertically utilizing studs 142 to complete dispensing unit 80.

Rotation of the plurality of elevating screws 110 is facilitated through the combination of a plurality of sprockets 146, drive belt 186, elevating motor 154 and gear box 156, all mounted to the underside of top support 108 and operably coupled to one another to make up the vertical displacement means of dispensing device 82. As more clearly shown in FIGS. 5A and 5B, each of the plurality of elevating screws 110 includes a sprocket 146 ridgedly attached to the upper end of the elevating screw 110 so that as sprocket 146 rotates elevating screw 110 rotates accordingly.

To provide synchronized rotation of the plurality of sprockets 146 and elevating screws 110, drive belt 186 couples each of the plurality of sprockets 146 to elevating motor 154 through gear box 156 and elevating sprocket 149. In the preferred embodiment, elevating motor 154 is electrically controlled by computer 72 mounted within intelligent dispensing 24. To provide greater torque and slower rotation speeds, elevating motor 154 is mechanically coupled to gear box 156 which is then coupled to elevating sprocket 149. As elevating sprocket 149 rotates in one direction or the other, drive belt 186 is pulled causing rotation of the plurality of sprockets 146 and elevating screws 110. Tension sprocket 147 is used to assist in maintaining drive belt 186, which in the preferred embodiment is basically a metal bicycle chain, at the correct tension for proper operation. While not disclosed in detail one of ordinary skill in the art will understand that the various sprockets and elevating screws described all include various arrangements of bearings such as those shown in FIG. 4B by reference numeral 158. Bearings 158 allow for smooth rotation of the components with a minimum amount of resistance.

Also an integral part of dispensing device 82 is the horizontal displacement means which pushes product 114 from product shelf 102 and through delivery door 44 to the customer. The horizontal displacement means is comprised of push plate 116 which includes a downward vertically extending backstop 118. Push plate 116 is mechanically coupled to the underside of top support 108 by two longitudinally extending roller tracks 190. The roller tracks 190 are similar to drawer slides found in furniture such as desks and dressers, and allow push plate 116 to travel along the lengthwise axis of top support 108. In operation, push plate 116 defaults to a fully retracted position away from door 42. To dispense product 114 pursuant to a customers request, once the vertical displacement means has positioned product 114 in a predetermined upper position, push plate 116 travels longitudinally toward the front of dispensing device 82 or towards door 42 causing backstop 118 to come in contact with product 114. Backstop 118 pushes product 114 horizontally towards the front of dispensing device 82 and out of delivery door 44 to the customer. Once product 114 has been dispensed push plate 116 travels back to its fully retracted default position. The vertical displacement means then elevates the next product 114 in position for horizontal displacement.

The horizontal displacement means is shown in FIGS. 5A and 5B and is comprised of discharge motor 152, gear box 157, discharge sprocket 151, discharge belt 188 and an additional sprocket 146 coupled to discharge belt 188. Similar to the arrangement described for the vertical displacement means, discharge motor 152 is mounted on the underside of top support 108 and mechanically coupled to gear box 157 to provide greater torque at lower speeds. Gear box 157 causes discharge sprocket 151 to rotate thereby pulling discharge belt 188 in whichever direction discharge sprocket 151 is rotating. Aligned longitudinally with discharge sprocket 151 is additional sprocket 146 which ensures that discharge belt 188 travels longitudinally and in parallel with the two roller tracks 190 coupled to push plate 116. To accomplish the horizontal displacement of push plate 116 discharge belt 188 is fixedly attached to push plate 116 by belt coupler 218. In operation, as discharge belt 188 is pulled back and forth longitudinally, push plate 116 is pulled with discharge belt 188 by belt coupler 218. As described earlier for elevating motor 154, discharge motor 152 is electrically controlled by computer 72.

By referring to FIG. 4A it should be apparent that as product 114 is displaced horizontally delivery door 44 must be moved to an open position to allow product 114 to pass through door 42 and to the customer. The product feed or delivery door control means is comprised of bell crank 122 attached to mounting bracket 174 through mounting screw 130. Rotation of bell crank 122 causes delivery door 44 to retract into an open position and then close once bell crank 122 is rotated to its initial position. Operation of bell crank 122 will be described in further detail in reference to FIG. 6.

Referring to FIGS. 5A and 5B, the means of providing displacement of bell crank 122 will be described. In general, displacement of push plate 116 causes bell crank 122 to move between its various positions. Mechanically coupled to bell crank 122 is cable 126 which is run over pulley 128 longitudinally and around pulley 198. Cable 126 is then routed in the direction of door 42. The end of cable 126 opposite that coupled to bell crank 122 is attached to spring 182 which itself is anchored to top support 108 through coupling aperture 184. Cable 126 is also releasably aligned through spring sleeve catch 194 in backstop 118 of push plate 116. As cable 126 is not rigidly attached at spring sleeve catch 194 it passes freely through backstop 118 without affecting any movement in push plate 116. Finally, sleeve 196 is rigidly attached to cable 126.

When push plate 116 is retracted to its default position, spring sleeve catch 194 travels in the right hand direction until it comes in contact with sleeve 196. Because sleeve 196 is fixedly attached to cable 126, as push plate 116 and spring sleeve catch 194 continue to travel in the right hand direction, cable 126 is pulled to thereby extend spring 182. When push plate 116 is in its fully retracted position, delivery door 44 is intended to be in a closed condition with bell crank 122 in its default position. In response to a product purchase, horizontal displacement of product 114 by push plate 116 causes spring sleeve catch 194 to move in the left hand direction away from sleeve 196, allowing spring 182 to retract thereby pulling cable 126. Cable 126 then in turn pulls bell crank 122 to its retracted position opening delivery door 44 in time to allow product 114 to be displaced horizontally out of intelligent dispensing machine 24 and to the customer. Once the customer has retrieved product 114, push plate 116 retracts to its default position causing spring sleeve catch 194 to release tension applied to bell crank 122. This in turn allows bell crank 122 to return to its default position closing delivery door 44 until the next user purchase. As previously described, translation of push plate 116 to its default position applies tension to spring 182 to be used to retract cable 126 during the next delivery door 44 opening.

In order to actually open delivery door 44, lever 121 is securely coupled to delivery door 44 which is coupled to axle 212 adjacent bell crank 122. In operation, lever 121 is coupled to axle 212 such that it extends from axle 212 at approximately a 45 degree angle from delivery door 44. As bell crank 122 is rotated clockwise peen 119, which extends horizontally from bell crank 122, pushes against lever 121 causing it to rotate in a counter-clockwise direction turning axle 212 and delivery door 44 in the same direction thereby opening delivery door 44. To close delivery door 44, bell crank 122 rotates counter clockwise effectively moving peen 119 downward allowing delivery door 44 to close under the pressure exerted upon door 44 by torsion spring 92 which pivots about axle 212.

To assist computer 72 in controlling the vertical and horizontal displacement means of dispensing device 82 a plurality of sensors provide computer 72 with electronic feedback as to the position at any given moment of product shelf 102 and push plate 116. First, upper limit switch 166 and lower limit switch 170 provide computer 72 with an indication as to when product shelf 102 reaches its upper most position and its lower or default position.

Referring FIG. 4B, both upper and lower limit switches 166 and 170 are mounted to vertical switch bracket 144 which is attached to bottom support 100. Both limit switches function in the same manner in that product shelf 102 triggers the switch by making contact with its actuator when shelf 102 reaches its upper or lower most positions. In the upper most position, product shelf 102 causes movement of actuator 168 which is coupled to upper limit switch 166. In its lower most position, product shelf 102 causes actuator 172 to move thereby triggering lower limit switch 170. In either case, limit switches 166 or 170 send an electronic signal to computer 72 in response to the appropriate movement of product shelf 102. Upper and lower limit switches 166 and 170 are important because they indicate to computer 72 when elevating motor 154 should be stopped. This prevents damage to motor 154 that would otherwise be caused if it were to continue rotating the plurality of elevating screws 110 when no further movement of product shelf 102 is possible. In addition, a signal from upper limit switch 166 would also indicate to computer 72 that dispensing device 82 no longer contains any products 114 and is ready to be restocked. Upper limit switch 166 could also be configured to provide computer 72 with an indication as to when product shelf 102 is in position to discharge the last product. This would indicate to computer 72 that after one more product 114 is discharged product shelf 102 will be empty and ready to be restocked.

Referring to FIG. 5B, discharge reset sensor 202 indicates to computer 72 when push plate 116 reaches its fully retracted default position. Push plate 116 is equipped with discharge cam 192 which contacts actuator 204 of discharge reset sensor 202 as push plate 116 translates longitudinally to its default position. Computer 72 uses this information to then trigger vertical displacement means. This is important because if products 114 are raised upwards by vertical displacement means before push plate 116 has been fully retracted, the products 114 could become jammed against backstop 118 causing a malfunction of and possibly damage to dispensing device 82.

In order to determine the horizontal position of push plate 116 and the vertical position of product shelf 102 during either components travel, computer 72 receives electronic feedback from product discharge sensor 162 and product elevation sensor 164. Both sensors, 162 and 164, are switches similar to those previously discussed for determining the upper and lower limits of product shelf 102 and the default position of push plate 116. In operation, product discharge sensor 162 and product elevation sensor 164 keep track of the individual positions of both horizontal and vertical displacement means by signaling computer 72 every full or half rotation of the associated discharge sprocket 151 or elevation sprocket 149. To accomplish this each sprocket is equipped with a pulse actuator 160 comprised of a protuberance extending from the sprocket. As the associated sprocket rotates the pulse actuator 160 comes in contact with its corresponding sensor thereby signaling computer 72 of one rotation of the sprocket. If desired, more than one pulse actuator 160 can be incorporated within the sprockets so that computer 72 receives a signal every half rotation or quarter rotation or any other increment.

Using pre-programmed values for the lengths of drive belt 186 and discharge belt 188, and feedback provided from upper limit switch 166, lower limit switch 170 and discharge reset sensor 202, computer 72 is able to calculate from the number of rotations counted by product discharge sensor 162 and product elevation sensor 164 the positions for both push plate 116 and product shelf 102 as they travel between positions. By knowing how far push plate 116 or product shelf 102 have traveled, computer 72 can correctly control discharge motor 152 and elevating motor 154 ensuring proper operation of dispensing device 82 while avoiding damage to the unit.

In an alternate embodiment, product discharge sensor 162 is replaced by discharge sensor 220. Instead of having computer 72 count the number of times pulse actuator 160 triggers product discharge sensor 162, discharge sensor 220 signals computer 72 when product shelf 102 has fully traveled horizontally in the direction of delivery door 44, or toward the left in FIG. 5A. As push plate 116 translates longitudinally to the left of FIG. 5A, discharge cam 192 contacts actuator 222 of discharge sensor 220. The signal emitted by discharge sensor 220 indicates to computer 72 that push plate 116 should be stopped as no further travel in the leftward direction is possible.

In addition, product position transducer 400, operably coupled to top support 108, is used to keep track of the elevation of product 114 upon product shelf 102, instead of computer 72 monitoring feed back from product elevation sensor 164, as previously discussed. Product position transducer 400 is shown in FIGS. 4A, 5A, 9 and 12 and will be described further primarily in relation to FIG. 9. Product position transducer 400 is comprised of two brackets 412 coupled in parallel to create a frame in which various other components are mounted. As shown in cross section in FIG. 9, coupled to one bracket 412 is product position switch 406 having actuator 410. Also positioned between brackets 412 is lever 404 which freely rotates about axle 408 which itself is disposed between brackets 412 and mechanically coupled therebetween. Attached to one end of brackets 412, opposite the end to which lever 404 is coupled, is hook 414 used to maintain product position transducer 400 within top support 108. Product position transducer 400 is coupled to top surface 108 through aperture 402 cut in a rectangular shape within top surface 108. Adjacent aperture 402, slot 418 is also cut out of top surface 108 to receive hook 414. Most of transducer 400 is disposed within aperture 402 and positioned beneath top surface 108. Once in position, hook 414 is disposed within slot 418 and cover plate 416 is then coupled to top surface 108 such that a portion of cover plate 416 overlaps a top portion of hook 414 thereby trapping hook 414 allowing brackets 412 and the entire transducer 400 to pivot.

Figure 12:
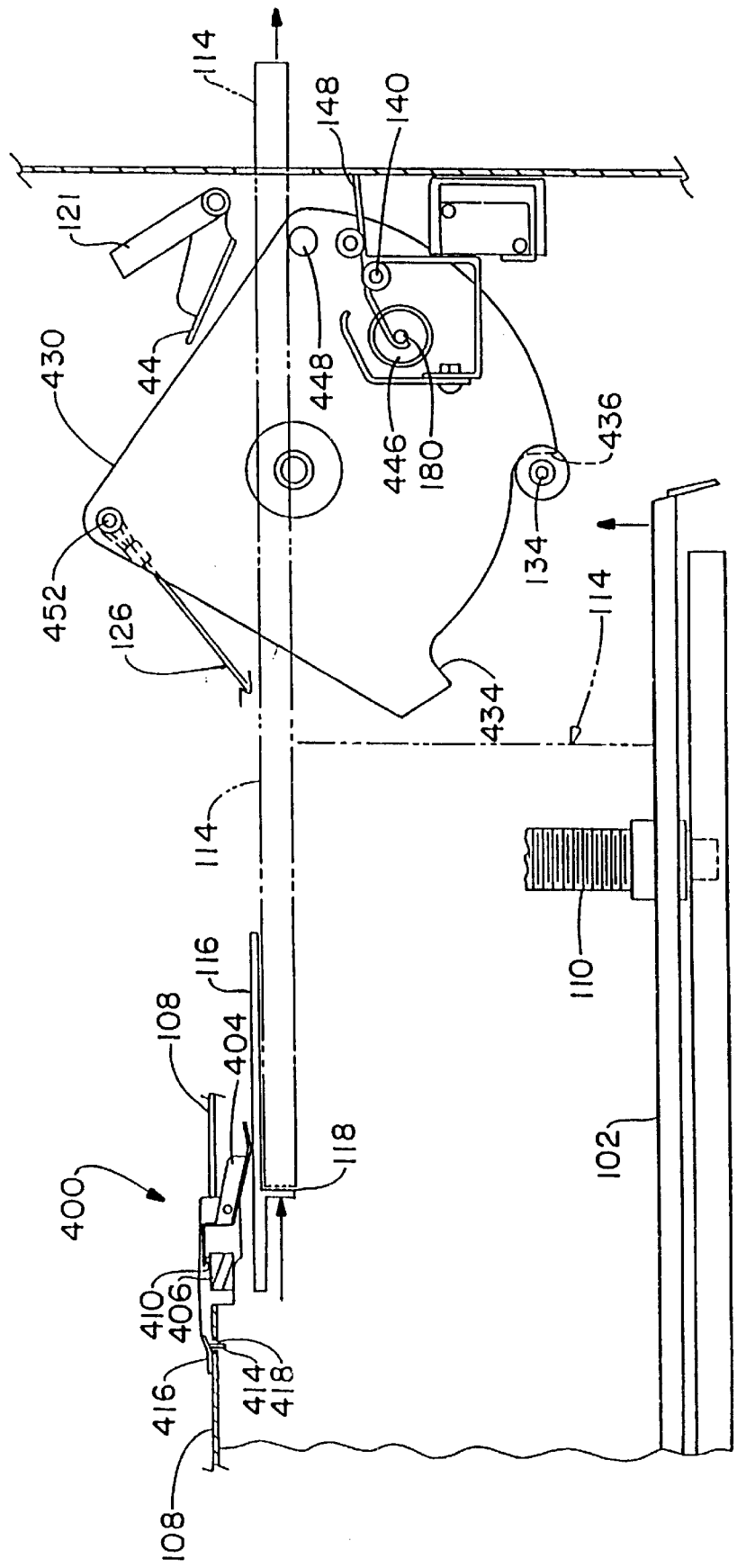
FIG. 12 illustrates a partially schematic side elevational view of the product dispensing unit incorporating the preferred embodiment of the bell crank shown in FIG. 10.

Referring to FIG. 4A, product position transducer 400 provides computer 72 with an indication or signal that product 114 has been elevated vertically and is now in position for horizontal displacement by push plate 116. As product 114 is elevated it contacts lever 404 causing lever 404 to come in contact with actuator 410 thereby triggering a signal to computer 72 from product position switch 406. The number of rotations previously counted by product elevation sensor 164 are no longer needed to keep track of the vertical elevation of products 114. Nonetheless, product elevation sensor 164 is still monitored to confirm rotation of elevating screws 110. Referring to FIG. 12, the importance of hook 414 of product position transducer 400 will now be explained. Push plate 116 contacts lever 404 during horizontal displacement. To prevent damage to product position transducer 400 the combination of hook 414 and cover plate 416 allows transducer 400 to be flexibly coupled to top surface 108 such that when push plate 116 travels horizontally coming into contact with lever 404 the entire transducer 400 moves upward through aperture 402. In operation, push plate 116 never travels so far to the right, in FIG. 12, that lever 404 is able to drop down and into the path of push plate 116 as it is retracted to the left.

An additional feature included in dispensing device 82 are locators 106 shown FIG. 4A. Extending upward from bottom support 100 are two locators 106 spaced apart transversely which act as a support and stop for products 114 when stacked upon product shelf 102. Locators 106 extend through apertures formed in product shelf 102 best shown in FIG. 5B as apertures 200. Each locator 106 is shaped from a single piece of material, which in the preferred embodiment is metal, and includes two bends which mirror the z-shape of each of apertures 200. During operation product shelf 102 freely translates up or down with locators 106 disposed through apertures 200 keeping the product 114 stack straight. This prevents products 114 from shifting into unacceptable positions within dispensing device 82.

Figure 6:
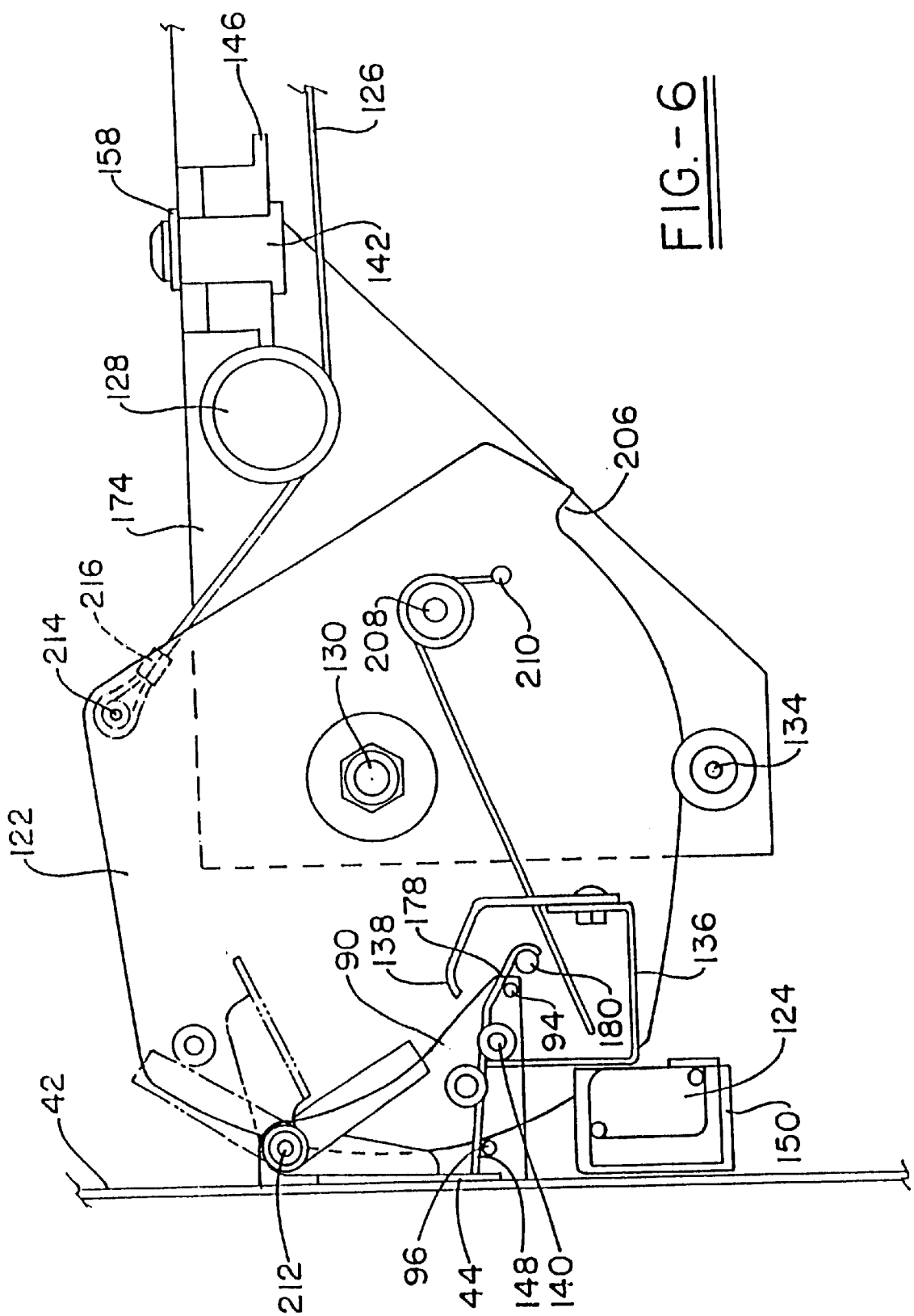
FIG. 6 is a partially schematic elevational view of a dispensing unit door opening and security device as applied to the invention.

Turning to FIG. 6, individual delivery door 44 and its associated components will now be described in further detail. Earlier in relation to FIG. 3 it was noted that product delivery doors 44 are coupled within door 42 of intelligent dispensing machine 24 and therefore are required to travel freely when door 42 is moved to its open condition. The components shown in FIG. 6 are all directly or indirectly coupled to door 42 and therefore are capable of being moved out of operable positioning with dispensing devices 82. To allow individual delivery door 44 to translate between an open and closed condition, delivery door 44 is coupled to axle 212, itself coupled to door 42 by a pair of mounting brackets 90 (shown in FIG. 5A). As a theft deterrent measure, a plurality of door lock fingers 148 are coupled to a separate axle 140. Each door lock finger 148 extends horizontally towards delivery door 44 and defaults to a position which blocks delivery door 44 preventing the door from being pushed open from outside of dispensing machine 24. The default position of delivery door 44 is achieved by having weight rod 180 act as a counterbalance whose weight forces door lock fingers 148 into the upper or locked position. Coupled to at least one mounting bracket 90 are pins 94 and 96, respectively, which extend horizontally from mounting bracket 90. Pins 94 and 96 act as stops which restrict the travel or rotation of door lock fingers 148. Also coupled to axle 140 is door actuator 136 having a product contact portion 138. Referring to FIG. 4A, when product 114 is translated by push plate 116 horizontally toward delivery door 44, product 114 eventually comes in contact with product contact portion 138 of door actuator 136. When this happens the weight of product 114 causes door actuator 136 to move downward which in turn contacts door switch 124. To accommodate different types and sizes of product 114, door actuator 136 is coupled to product contact portion 138 by adjustment screw 422. Although not shown, product contact portion 138 includes an elongated aperture through which adjustment screw 422 passes allowing the vertical orientation of product contact portion 138 to be adjusted either higher or lower depending upon the needs of the particular product 114 to be dispensed.

Door switch 124 is mounted to door 42 by standard mechanical coupling through mounting bracket 150. When product 114 causes downward movement of door actuator 136, door switch 124 is actuated and sends an electronic signal to computer 72 indicating that delivery door 44 is in an open and unlocked state. This information is useful to computer 72 in that malfunctions that keep delivery door 44 in an unlocked state can be detected for immediate correction thereby protecting dispensing machine 24 and its inventory. Door switch 124 also indicates to computer 72 that product 114 has been pushed forward through delivery door 44 but has not yet been removed by the customer. As soon as product 114 is removed, door switch 124 signals computer 72 thereby allowing computer 72 to immediately retract push plate 116 causing delivery door 44 to close. Once push plate 116 has been retracted to its default position computer 72 then elevates the next product 114 in position for subsequent transactions.

FIG. 6 shows the configuration of bell crank 122 and its associated components in greater detail. As shown, bell crank 122 includes torsion springs 132 wrapped around spring mount 208 and then held in place by retainer 210. Spring mount 208 consists of a horizontally extending post coupled to the inner portion of bell crank 122 in close approximation with retainer 210, which itself is nothing more than an aperture disposed through bell crank 122. Torsion spring 132 includes a substantially straight portion which then couples to spring mount 208 by winding around mount 208 and then ending with a small part of torsion spring 132 inserted within aperture or retainer 210. Coupled to another portion of bell crank 122 is cable 126 which is routed around cable mount 214 and back upon itself where the two portions of cable 126 are attached together by barrel 216. As cable 126 is pulled in the right hand direction under pulley 128, bell crank 122 rotates in a clockwise direction until stop 206 comes into contact with brake 134, which extends horizontally from mounting bracket 174. As bell crank 122 rotates in the clockwise direction the elongated portion of torsion spring 132 comes into contact with weight rod 180 causing torsion spring 132 to wind tighter around spring mount 208. As torsion spring 132 continues to wind tighter around spring mount 208, the elongated portion of torsion spring 132 continues to apply force against weight rod 180 in an upward direction thereby causing doorlock fingers 148 to move downward and out of the path of delivery door 44. In addition, this causes torsion spring 132 to place a counter clockwise force upon bell crank 122. When cable 126 is released the counter clockwise force being applied on bell crank 122 by torsion spring 132 causes bell crank 122 to rotate back to its default position in which delivery door 44 is in its closed condition. Once the elongated portion of torsion spring 132 is removed from weight rod 180, the weight of weight rod 180 causes doorlock fingers 148 back into their default upper position blocking delivery door 44 thereby preventing door 44 from being forced open from outside of dispensing machine 24.

Figure 10:
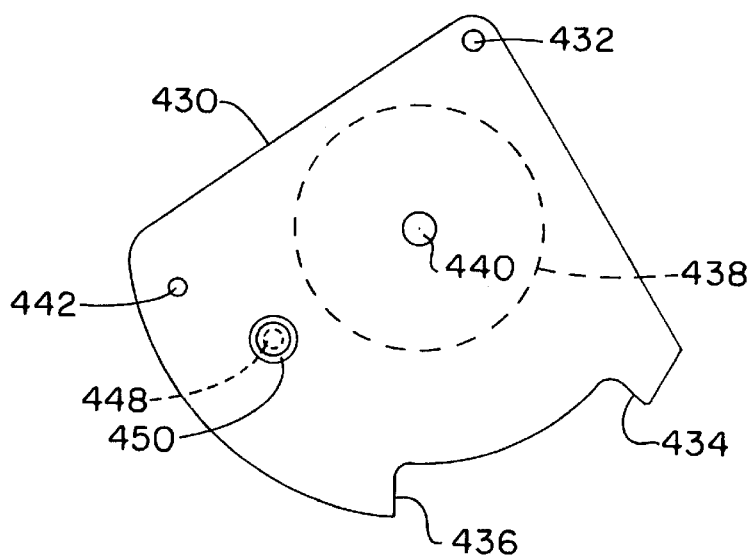
FIG. 10 is a front elevational view of the preferred embodiment of a bell crank which forms a part of the product dispensing unit shown in FIGS. 4A and 4B.
Figure 11:
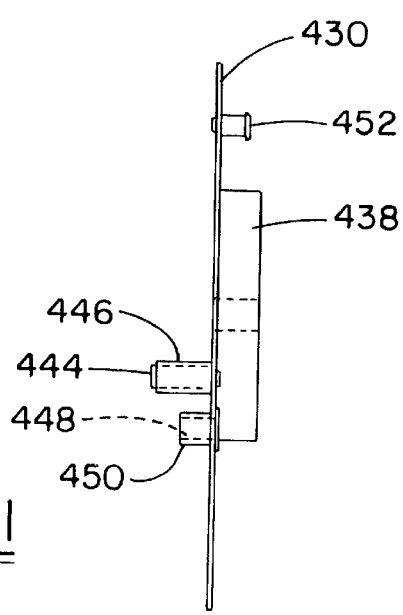
FIG. 11 is a side elevational view of the preferred embodiment of the bell crank shown in FIG. 10.

FIGS. 10, 11 and 12 disclose an alternative embodiment of bell crank 122 which was previously discussed with reference to FIGS. 4A and 6. In FIGS. 4A and 6, bell crank 122 was shown coupled to the left side of dispensing device 82. The alternative embodiment, bell crank 430, is similar to bell crank 122 with one advantage being its smaller size. Bell crank 430 therefore requires less material making it lighter in weight. Referring to FIG. 10, bell crank 430 includes mounting aperture 440 disposed in approximately the center of bell crank 430, with guide 438 surrounding aperture 440 and extending horizontally from one side of bell crank 430. Guide 438 spaces bell crank 430 from mounting bracket 174 (shown in FIG. 6) to which bell crank 430 is mounted. Along the lower angled edge of bell crank 430 are first and second stops 434 and 436, respectively, which prevent over rotation of bell crank 430 by coming in contact with break 134, as shown in FIG. 12. Bell crank 122 bell crank 430 includes aperture 432 in which peen 452 extends horizontally therefrom. As shown in FIG. 12, peen 452 attaches cable 126 to bell crank 430. Referring to FIGS. 11 and 12, bell crank 430 also includes peen 444 extending horizontally and surrounded by roller 446. Peen 444 and roller 446 extend horizontally from aperture 442 and functions similarly to peen 119, as shown in FIG. 6. Roller 446 does provide the advantage of less wear and tear on lever 121 and itself because roller 446 provides less resistance than the single peen 119 of FIG. 6 simply pushing and sliding against lever 121.

One of the other differences in the configuration of bell crank 430 is that it no longer uses torsion spring 132 which is now replaced by nylon sleeve 450 and magnet 448 disposed within sleeve 450. Referring to FIG. 12, bell crank 430 rotates counter clockwise magnet 448 moves weight rod 180. As magnet 448 travels its magnetic force attracts weight rod 180 causing it to rotate in an upward direction thereby causing doorlock fingers 148 to rotate in the downward direction clearing the path for delivery door 44 to open. As bell crank 430 is then rotated in a clockwise direction, magnet 448 moves away from weight rod 180 allowing the weight of rod 180 to cause doorlock fingers 148 to move back into their upward blocking position preventing delivery doors 44 from opening.

Figure 7:
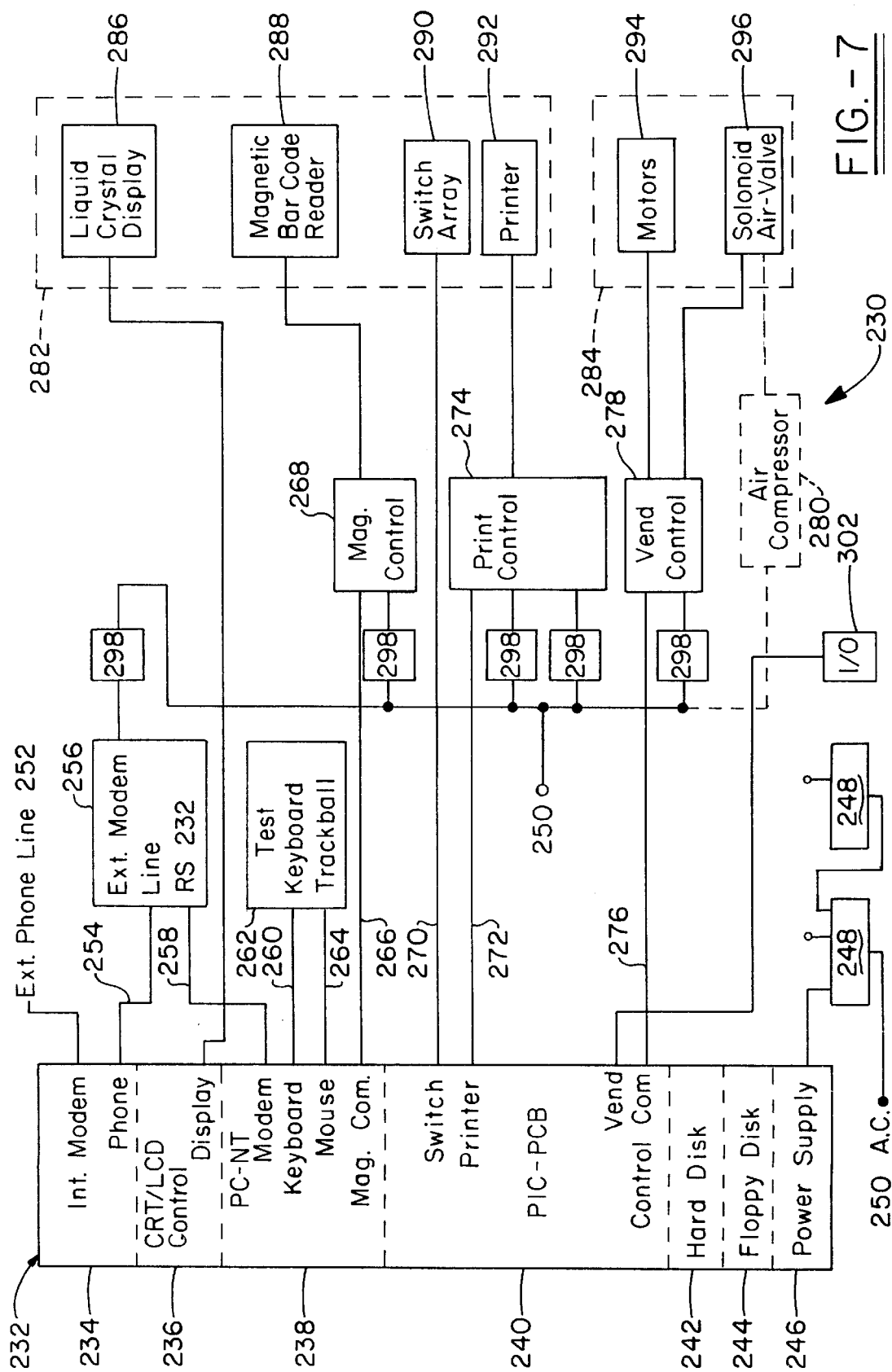
FIG. 7 is a block diagram illustrating the control functions as applied to the dispensing machine.

Turning to FIG. 7, the electronic control system 230 of intelligent dispensing machine 24 will now be described. Previously, Applicant has referred to computer 72 when making reference to the electronic control of various components. For purposes of FIG. 7, computer 232 is analogous to computer 72 referred to previously in FIG. 3. Computer 232 is comprised of CPU 238 which includes the following peripherals; CRT/LCD controller 236, internal modem 234, peripheral interface 240, hard disk drive 242, floppy disk drive 244 and power supply 246. These components are electrically coupled and interfaced together to control and monitor intelligent dispensing machine 24. In the preferred embodiment, computer 232 is a personal computer (PC) although one of ordinary skill in the electronic and computer arts would understand that a wide variety of computer control systems could easily be substituted for computer 232.

To interface with CPU 238, keyboard 262 is connected to CPU 238. If desired a track ball or mouse can also be coupled to CPU 238. Keyboard 262 is primarily used to preprogram computer 232 during assembly or for troubleshooting and maintenance of intelligent dispensing machine 24. To allow dispensing machine 24 to communicate with the integrated product supply network 10, as shown in FIG. 1, electronic control system 230 includes both internal modem 234 and external modem 256 coupled to computer 232 by means well known in the art. The dual modems allow various combinations of electronic communications to and from intelligent vending machine 24. The front panel interface 282 of intelligent dispensing machine 24 includes CRT display 286 (or LCD or any other type of electronic display), magnetic/bar code card swipe reader 288, switch array 290 and receipt printer 292. Both CRT display 286 and switch array 290 are electronically connected to computer 232 while magnetic/bar code card swipe reader 288 interfaces with computer 232 through controller 268 and printer 292 interfaces with computer 232 through printer interface 274. In addition, the various electric motors included in each dispensing device 82 are controlled by computer 232 through control interface 278 with the electronic feedback from the plurality of limit switches and sensors incorporated within each dispensing device 82 communicated to computer 232 through I/O device 302. The electronic control system 230 of the preferred embodiment also includes the plurality of AC power and filter strips used to deploy AC power 250 where needed throughout dispensing machine 24 while at the same time filtering electronic noise and protecting dispensing machine 24 from high voltage surges commonly associated with AC power sources.

The electronic technology used to implement control system 230 is extremely well known to those of ordinary skill in the electronic and computer arts. For the most part control system 230 is comprised of standard, off the shelf computers and peripheral components easily understood from the disclosure in FIG. 7. The control system 230 could easily be implemented through a wide variety of alternative systems, including but not limited to embedded microprocessor control systems, embedded micro-controller systems, programmable logic controllers or relay logic arrays.

Figure 8A:
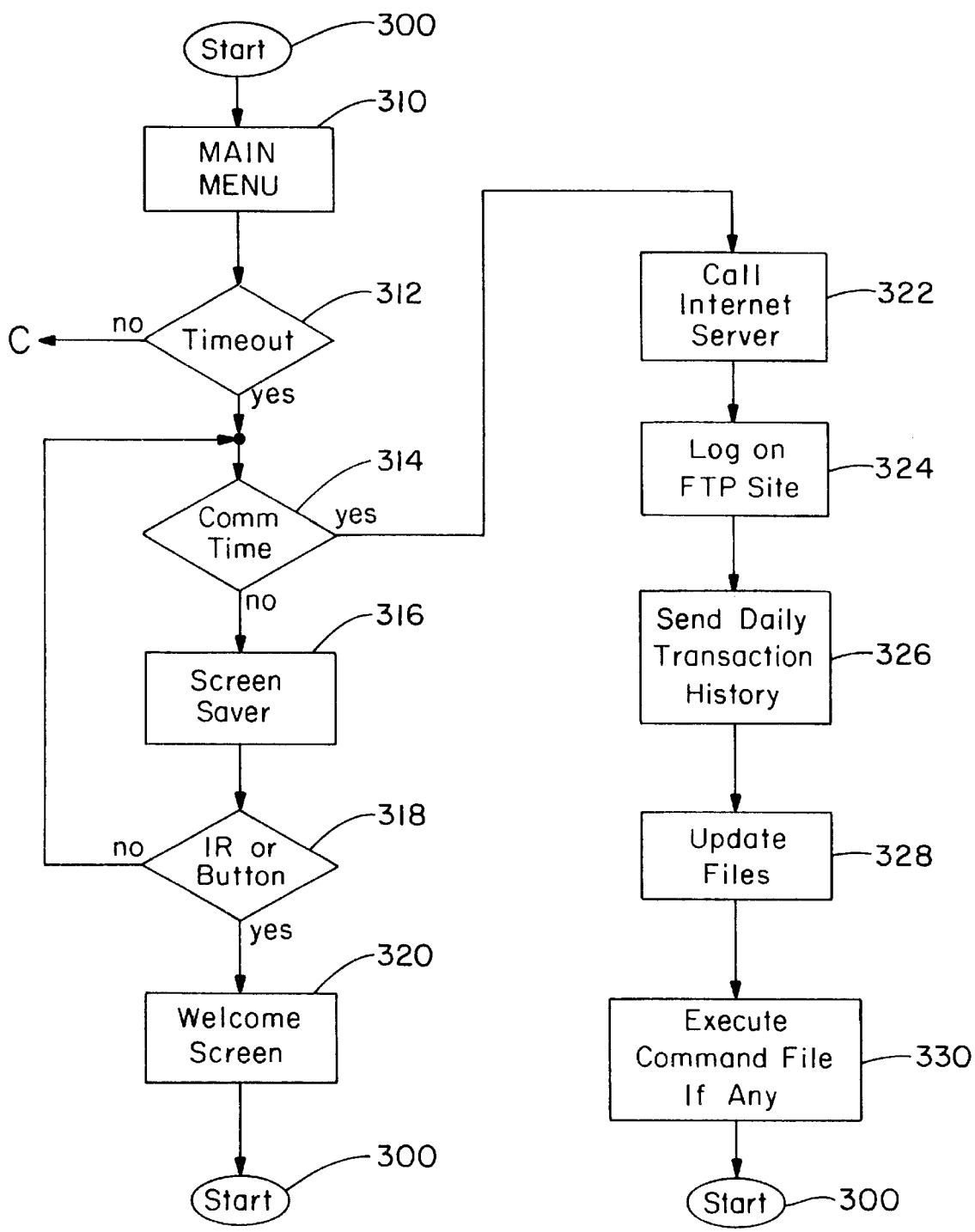
FIGS. 8A and 8B, when combined at line C—C, is a flow diagram illustrating the system controls as applied to the dispensing machine.
Figure 8B:
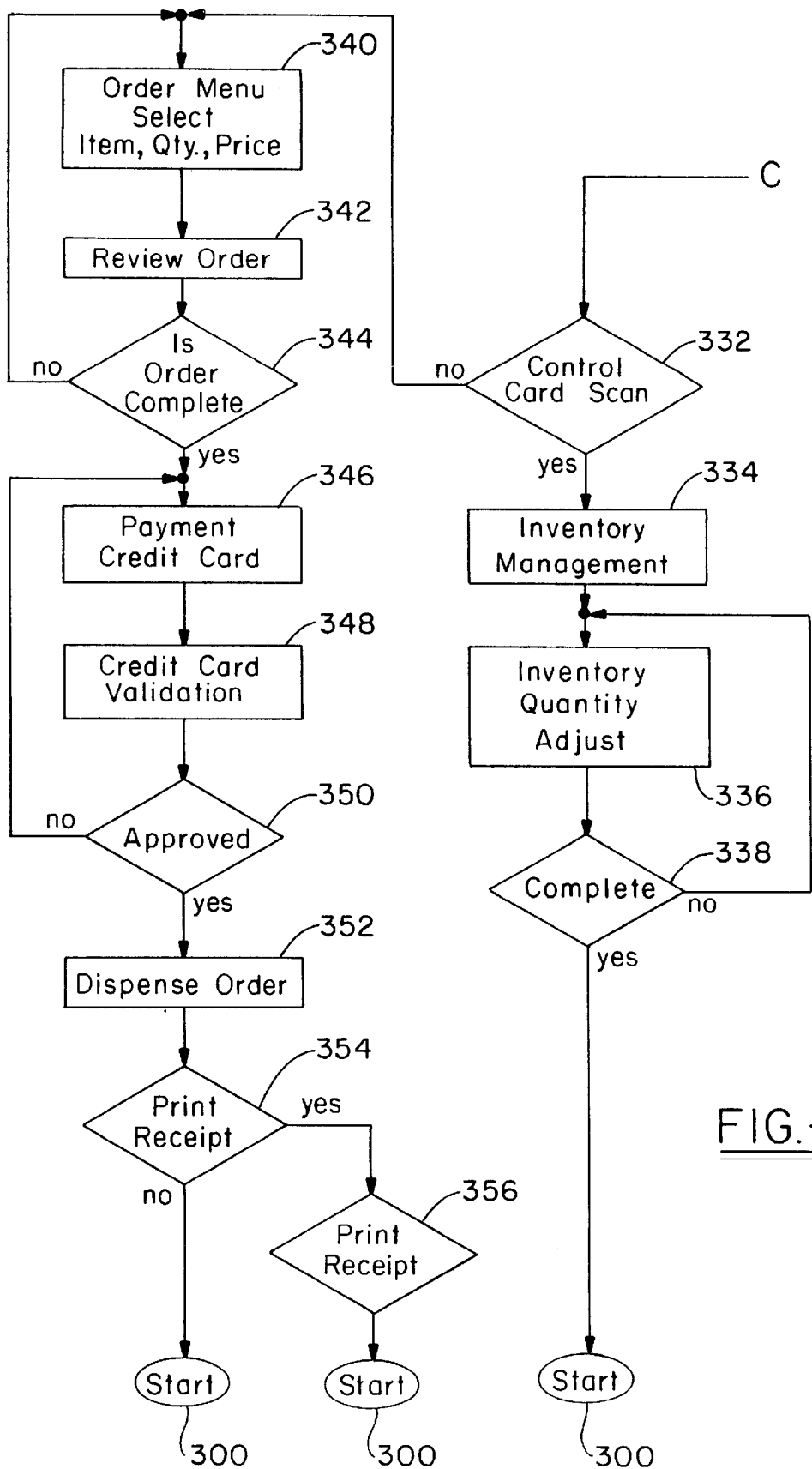
Figure 9:
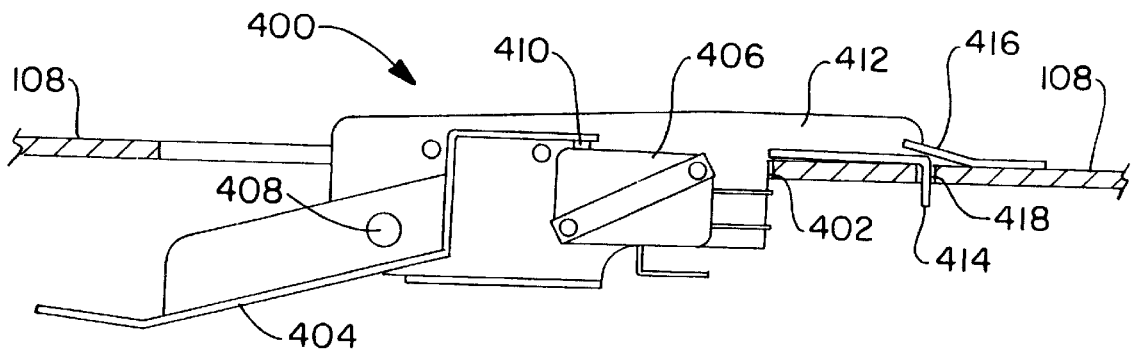
FIG. 9 illustrates a partially schematic side elevational view of a product position transducer which forms a part of the product dispensing unit shown in FIGS. 4A and 4B.

FIG. 8 is a flow diagram of the process steps implemented by electronic control system 230 to operate and control intelligent dispensing machine 24. When intelligent dispensing machine 24 is initially powered the software process starts 300 by entering into the main menu 310 to provide the customer with various types of information through display 52. The control system 230 then waits for time out 312 to occur. If a preset time out 312 does lapse, electronic control system 230 checks to see if a predetermined time has been reached for dispensing machine 24 to automatically initiate communications with integrated product supply network 10. If the predetermined time has not been reached then screen saver 316 is activated to prevent character burn in on display 52, a common type of display damage. After screen saver 316 has been activated control system 230 checks to see if an input or interrupt request 318 has occurred, and if so welcome screen 320 is displayed. Control is then returned to main menu 310. If an input or interrupt request 318 has not occurred control of the process returns to checking for a predetermined communication time 314. This control loop will continue indefinitely until certain other conditions have been met.

If during operation control system 230 detects the predetermined time for automatic communications 314 has been reached it will then place a telephone call to Internet server 322, log on to the FTP server 324, transmit the daily transaction history 326 from intelligent dispensing machine 24, update its own internal operating files and then execute any command files provided from central processing unit 12 of integrated product supply network 10. As described previously, control of the process then returns to the start 300 and back to main menu 310.

If time out 312 does not elapse, control system 230 then will check control card scanner 332 to see if maintenance personnel are in the process of restocking the inventory within dispensing machine 24. If a maintenance control card is detected dispensing machine 24 enters inventory management mode 334 during which time maintenance personnel are prompted to enter the inventory quantity adjustment values 336. Maintenance personnel are prompted to continue updating the inventory until complete, at which point control of the process returns to start 300 and main menu 310. If time out 312 does not elapse and a maintenance control card is not detected then control system 230 enters the order menu 340 which prompts the user through the various interface devices such as display 52, to enter the item, quantity, and/or other options for the desired products. Once entered, the user is prompted to review the order 342 and indicate at whether or not his or her order is complete 344. If the order is not complete order menu 340 is repeated. If the order is complete dispensing machine 24 requests credit card payment 346 from the user. Once the user swipes his or her credit, debit or bar code card through magnetic/bar code card reader 56, credit verification 348 takes place. Upon approval 350 products are dispensed 352 and if requested by the customer a receipt is printed 354. Whether a receipt is printed or not, control is returned to start 300 and back to main menu 310. If through credit card verification 348 the customer's credit card is not approved 350 the user is once again prompted for payment.

The process flow diagram of FIG. 8 is included to provide one of ordinary skill in the art with a general overview of the various functions which must be performed by intelligent dispensing machine 24 to operate properly. Due to the unlimited flexibility of computers generally and electronic control system 230 of the present invention, one of ordinary skill in the electronic and computer control arts will easily recognize that hundreds of variations on the process control shown in FIG. 8 can be accomplished simply through variations in the software which directs control system 230. The present invention is not to be limited to only the process steps and perimeters disclosed in FIG. 8. The novelty of the present invention lies in the combination of an intelligent dispensing machine coupled with a unique dispensing device to accommodate nontraditional vending type products where the intelligent dispensing machine is part of an integrated supply network. The integrated supply network encompasses the entire channel of distribution for products provided to customers through the intelligent dispensing machines.

While this invention has been described in detail with reference to specific embodiments and with particular reference to the preferred embodiment, this description is by way of illustration and not limitation. As will be apparent to those skilled in the art, various modifications can be made without departing from the scope and spirit of the invention. For instance, Applicant contemplates the mechanisms in the intelligent dispensing machine being powered pneumatically. The dispensing machine could be coupled to a pneumatic supply, as typically found in industrial sites, or it could be equipped with an air compressor. Taken to extremes, the dispensing machine equipped with pneumatic mechanisms could be used in dangerous, highly explosive environments where electric motors cannot be used.

Applicant also contemplates the unique dispensing device being used to provide a wide variety of products. The dispensing devices could be used to offer food products such as frozen pizzas, burritos or sandwiches. This could be accomplished by housing a plurality of the dispensing devices within an freezer or refrigerated cabinet. The intelligent dispensing machine of the present invention could incorporate a variety of products, both office supplies and food, for use in college dormitories or office buildings. Customers would be able to obtain needed office supplies while at the same time getting something to eat. The combinations of products which can be offered using the unique dispensing device disclosed is unlimited.

What is claimed is:

1. A vending machine for distributing products comprising:
    means for selecting said products;
    means for receiving payment for said products;
    means for dispensing said products; and
    means for controlling said vending machine in response to said product selection means and said payment means to direct said product dispensing means to dispense said products;
    wherein said product dispensing means comprises at least one elevating screw operatively coupled to a product shelf, means for rotating said at least one elevating screw such that said product shelf travels up or down depending upon the direction of rotation of said at least one elevating screw, and means for horizontally displacing said products out of said vending machine;

wherein said horizontal displacement means comprises:

a push plate operatively coupled to said top support by at least one track roller, wherein said at least one track roller allows said push plate to travel horizontally;

a pulley coupled to said top support; and a discharge motor coupled to said push plate and said pulley by a discharge belt, wherein said discharge motor, through said discharge belt, causes said push plate to travel horizontally between said extended and said retracted position.

2. A vending machine as recited in claim 1, wherein said discharge belt is comprised of a chain, wherein said pulley is comprised of a sprocket and wherein said discharge motor includes a sprocket, said sprockets coupling said at least one elevating screw and said elevating motor to said chain.

3. A vending machine as recited in claim 1, wherein said at least one product dispensing means further comprises a discharge reset sensor which monitors said horizontal displacement means to determine when said push plate has reached a fully retracted position, and wherein said discharge reset sensor communicates said determined position of said push plate to said controller means.

4. A vending machine as recited in claim 1, further comprising a front panel with at least one product delivery door disposed through said door, said at least one product delivery door being operably positioned with said at least one product dispensing means such that said products pass through said at least one product delivery door as said products are partially ejected out of said vending machine.

5. A vending machine as recited in claim 4, wherein said product dispensing means further comprises a delivery door control means which maintains said at least one product delivery door in a locked and closed state until said product dispensing means horizontally ejects said products out of said vending machine when said delivery door control means unlocks and opens said at least one product delivery door.

6. A vending machine as recited in claim 5, wherein said delivery door control means comprises:

a bell crank operably coupled to said at least one product delivery door; and a cable operably coupled between said bell crank and said push plate;

wherein translation of said push plate from said retracted to said extended position causes said cable to rotate said bell crank thereby opening said at least one product delivery door; and wherein translation of said push plate from said extended to said retracted position causes said cable to rotate said bell crank thereby allowing said at least one product delivery door to close.

7. A vending machine as recited in claim 6, further comprising a spring, a pulley and a sleeve wherein said spring is coupled between said top support and one end of said cable, wherein said cable is extended over said pulley and attached to said bell crank and wherein said sleeve is operatively coupled to said cable such that translation of said push plate from said retracted to said extended position relieves pressure exerted upon said sleeve by said push plate allowing said spring to pull said cable rotating said bell crank to open said at least one product delivery door, and translation of said push plate from said extended to said retracted position causes said push plate to apply pressure upon said sleeve forcing said spring to extend and said cable to release said bell crank thereby allowing said at least one product delivery door to close.

8. A vending machine for distributing products comprising:

means for selecting said products;

means for receiving payment for said products;

means for dispensing said products; and means for controlling said vending machine in response to said product selection means and said payment means to direct said product dispensing means to dispense said products;

wherein said product dispensing means comprises at least one elevating screw operatively coupled to a product shelf, means for rotating said at least one elevating screw such that said product shelf travels up or down depending upon the direction of rotation of said at least one elevating screw, and means for horizontally displacing said products out of said vending machine.

9. A vending machine as recited in claim 8, wherein said product dispensing means further comprises a product discharge sensor which monitors said horizontal displacement means to determine the position of said horizontal displacement means and communicate said determined position to said controller means.

10. A vending machine as recited in claim 8, wherein said product dispensing means further comprises a product elevation sensor which monitors rotation of said elevating screw to determine the position of said product shelf as said product shelf travels between said full and empty positions, and wherein said product elevation sensor communicates said determined position of said product shelf to said controller means.

11. A vending machine as recited in claim 8, wherein said product dispensing means further comprises an upper limit sensor which monitors said product shelf to determine when said product shelf has reached a maximum vertical position, and wherein said upper limit sensor communicates said determined position of said product shelf to said controller means.

12. A vending machine as recited in claim 8, wherein said product dispensing means further comprises a lower limit sensor which monitors said product shelf to determine when said product shelf has reached a minimum vertical position, and wherein said lower limit sensor communicates said determined position of said product shelf to said controller means.

13. A vending machine for distributing products comprising:

means for selecting said products;

means for receiving payment for said products;

means for dispensing said products; and means for controlling said vending machine in response to said product selection means and said payment means to direct said product dispensing means to dispense said products;

wherein said product dispensing means comprises at least one elevating screw operatively coupled to a product shelf, means for rotating said at least one elevating screw such that said product shelf travels up or down depending upon the direction of rotation of said at least one elevating screw, and means for horizontally displacing said products out of said vending machine;

wherein said rotation means is comprised of an elevating motor coupled to said at least one elevating screw by a drive belt, wherein said elevating motor, through said drive belt, causes said at least one elevating screw to rotate such that said product shelf travels up or down depending upon the direction of rotation of said at least one elevating screw.

14. A vending machine as recited in claim 13, wherein said drive belt is comprised of a chain and wherein said at least one elevating screw and said elevating motor each include a sprocket, said sprockets coupling said at least one elevating screw and said elevating motor to said chain.

15. A vending machine for distributing products comprising:

at least one product dispensing means;

product selection means for interactively selecting said products;

means for receiving payment for said products; and controller means responsive to said product selection means and said payment means, said controller means controlling said at least one product dispensing means to dispense said products;

wherein said at least one product dispensing means includes means for vertically positioning said products and means for horizontally ejecting said vertically positioned products out of said vending machine;

wherein said at least one product dispensing means comprises:

a product shelf for storage of said products disposed between a top and bottom support;

vertical displacement means for moving said product shelf between a full and an empty position;

a push plate for transferring at least one of said products out of said vending machine; and horizontal displacement means for moving said push plate between an extended and a retracted position; and wherein said vertical displacement means comprises:

at least one elevating screw mounted between said top and bottom supports with said product shelf coupled to said at least one elevating screw; and an elevating motor coupled to said elevating screw by a drive belt, wherein said elevating motor, through said drive belt, causes said elevating screw to rotate such that said product shelf travels up or down depending upon the direction of rotation of said elevating screw.

16. A vending machine as recited in claim 15, wherein said drive belt is comprised of a chain and wherein said at least one elevating screw and said elevating motor each include a sprocket, said sprockets coupling said at least one elevating screw and said elevating motor to said chain.

17. A vending machine for distributing products comprising:

at least one product dispensing means;

product selection means for interactively selecting said products;

means for receiving payment for said products; and controller means responsive to said product selection means and said payment means, said controller means controlling said at least one product dispensing means to dispense said products;

wherein said at least one product dispensing means includes means for vertically positioning said products and means for horizontally ejecting said vertically positioned products out of said vending machine;

wherein said at least one product dispensing means comprises:

a product shelf for storage of said products disposed between a top and bottom support;

vertical displacement means for moving said product shelf between a full and an empty position;

a push plate for transferring at least one of said products out of said vending machine; and horizontal displacement means for moving said push plate between an extended and a retracted position; and wherein said horizontal displacement means comprises:

said push plate operatively coupled to said top support by at least one track roller, wherein said at least one track roller allows said push plate to travel horizontally;

a pulley coupled to said top support; and a discharge motor coupled to said push plate and said pulley by a discharge belt, wherein said discharge motor, through said discharge belt, causes said push plate to travel horizontally between said extended and said retracted position.

18. A vending machine as recited in claim 17, wherein said discharge belt is comprised of a chain, wherein said pulley is comprised of a sprocket and wherein said discharge motor includes a sprocket, said sprockets coupling said at least one elevating screw and said elevating motor to said chain.

19. A vending machine for distributing products comprising:

at least one product dispensing means;

product selection means for interactively selecting said products;

means for receiving payment for said products; and controller means responsive to said product selection means and said payment means, said controller means controlling said at least one product dispensing means to dispense said products;

a front panel with at least one product delivery door disposed through said door, said at least one product delivery door being operably positioned with said at least one product dispensing means such that said products pass through said at least one product delivery door as said products are partially ejected out of said vending machine;

wherein said at least one product dispensing means includes means for vertically positioning said products and means for horizontally ejecting said vertically positioned products out of said vending machine;

wherein said at least one product dispensing means further comprises a delivery door control means which maintains said at least one product delivery door in a locked and closed state until said at least one product dispensing means horizontally ejects said products out of said vending machine when said delivery door control means unlocks and opens said at least one product delivery door; and wherein said delivery door control means comprises:

a bell crank operably coupled to said at least one product delivery door; and a cable operably coupled between said bell crank and said push plate;

wherein translation of said push plate from said retracted to said extended position causes said cable to rotate said bell crank thereby opening said at least one product delivery door; and wherein translation of said push plate from said extended to said retracted position causes said cable to rotate said bell crank thereby allowing said at least one product delivery door to close.

20. A vending machine as recited in claim 19, further comprising a spring, a pulley and a sleeve wherein said spring is coupled between said top support and one end of said cable, wherein said cable is extended over said pulley and attached to said bell crank and wherein said sleeve is operatively coupled to said cable such that translation of said push plate from said retracted to said extended position relieves pressure exerted upon said sleeve by said push plate allowing said spring to pull said cable rotating said bell crank to open said at least one product delivery door, and translation of said push plate from said extended to said retracted position causes said push plate to apply pressure upon said sleeve forcing said spring to extend and said cable to release said bell crank thereby allowing said at least one product delivery door to close.

\* \* \* \* \*

UNITED STATES PATENT AND TRADEMARK OFFICE
CERTIFICATE OF CORRECTION

PATENT NO.    : 6,182,857 B1                                            Page 1 of 1
DATED         : February 6, 2001
INVENTOR(S)   : Doug A. Hamm et al.

It is certified that error appears in the above-identified patent and that said Letters Patent is hereby corrected as shown below:

Column 1,
Line 3, please add: -- This application claims the benefit of U.S. Provisional Application No. 60/080,259 filed April 1, 1998. --

Signed and Sealed this

Nineteenth Day of August, 2003

JAMES E. ROGAN
*Director of the United States Patent and Trademark Office*